United States Patent
Wang et al.

(10) Patent No.: US 12,526,061 B2
(45) Date of Patent: Jan. 13, 2026

(54) ULTRA-WIDEBAND (UWB) RESIDUAL SIDEBAND (RSB) CALIBRATION USING BI-PHASE SHIFT KEYING (BPSK) SIGNAL SOURCE

(71) Applicant: QUALCOMM INCORPORATED, San Diego, CA (US)

(72) Inventors: Cheng-Han Wang, San Jose, CA (US); Varun Amar Reddy, San Diego, CA (US); Qi Zhou, Milpitas, CA (US); Hsin-Hsu Chen, Santa Clara, CA (US); Liang Zhao, Saratoga, CA (US); Koorosh Akhavan, San Diego, CA (US); Yi Zeng, San Jose, CA (US); Chan Hong Park, San Jose, CA (US); Le Nguyen Luong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 300 days.

(21) Appl. No.: 18/471,345

(22) Filed: Sep. 21, 2023

(65) Prior Publication Data
US 2025/0105928 A1     Mar. 27, 2025

(51) Int. Cl.
*H04B 17/21* (2015.01)
*H04B 17/00* (2015.01)

(52) U.S. Cl.
CPC ......... *H04B 17/21* (2015.01); *H04B 17/0085* (2013.01)

(58) Field of Classification Search
CPC .............. H04B 17/21; H04B 17/0085
See application file for complete search history.

(56) References Cited

U.S. PATENT DOCUMENTS

| | | |
|---|---|---|
| 2003/0139167 A1 | 7/2003 | Ciccarelli et al. |
| 2013/0272175 A1 | 10/2013 | Zargari et al. |
| 2018/0083661 A1* | 3/2018 | Emadi ............... H04B 17/21 |

FOREIGN PATENT DOCUMENTS

| | | |
|---|---|---|
| WO | 2014164229 A1 | 10/2014 |
| WO | 2015142479 A1 | 9/2015 |

OTHER PUBLICATIONS

International Search Report and Written Opinion—PCT/US2024/043939—ISA/EPO—Mar. 3, 2025.
Partial International Search Report—PCT/US2024/043939—ISA/EPO—Dec. 5, 2024.

* cited by examiner

*Primary Examiner* — Elton Williams
(74) *Attorney, Agent, or Firm* — Smith Tempel Blaha LLC

(57) ABSTRACT

A system for radio frequency (RF) residual sideband (RSB) calibration includes a complex (in phase/quadrature (I/Q)) signal receiver, a signal generator configured to generate a transmit (Tx) signal, a first phase shifter operably coupled to the real signal transmitter, a first signal combiner configured to combine a receive (Rx) signal with the transmit (Tx) signal to generate a first combined signal, a second phase shifter configured to provide a selected phase shift to the first combined signal, and a complex downconverter configured to generate an in phase Rx signal and a quadrature Rx signal alternatively using an in phase LO signal and a quadrature LO signal to generate one or more signals indicative of relative Tx-Rx LO phase (θ), amplitude (A), Tx LO I/Q phase mismatch (ε), Rx I/Q amplitude mismatch (α), and Rx I/Q phase mismatch (φ) at the output of the complex receiver.

25 Claims, 12 Drawing Sheets

ULTRA-WIDEBAND (UWB) RESIDUAL SIDEBAND (RSB) CALIBRATION USING BI-PHASE SHIFT KEYING (BPSK) SIGNAL SOURCE

FIELD

The present disclosure relates generally to electronics, and more specifically to amplifiers in a transceiver.

BACKGROUND

Wireless communication devices and technologies are becoming ever more prevalent as are communication systems. A communication system may be configured to use what is referred to as ultra wideband (UWB) communication technology, which is a radio technology that uses a low energy signal for short-range, high-bandwidth communications. One use for UWB radio includes location determination and ranging technology where a radio frequency signal can be used to determine a location of a user equipment (UE). For example, communication devices such as smartphone and a receiver (referred to as a tag) can be used to determine a location of the tag. In some applications, an UWB radio system includes a receiver (Rx) that can process a complex quadrature (in phase (I) and quadrature (Q)) signal and a transmitter that generates a pulse radio signal, such as a bi-phase shift keying (BPSK) signal that is a real signal generated by modulating a constant frequency carrier wave by changing a phase of the signal between 0 degrees and 180 degrees.

Two indicators that can be used to determine a location of a UE using UWB technology include time of arrival (ToA) and angle of arrival (AoA) of a radio signal. Therefore, it is desirable to have a way of accurately determining ToA and AoA of a received signal.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a radio frequency (RF) residual sideband (RSB) calibration circuit including a complex (in phase/quadrature (I/Q)) signal receiver, a signal generator configured to generate a transmit (Tx) signal, a first phase shifter connected to the signal generator, the first phase shifter configured to selectively process one of an in phase local oscillator (LO) signal and a quadrature LO signal to create an initial phase between receive in phase (I) and quadrature (Q) signals to create balanced I/Q signals, a first signal combiner configured to combine a receive (Rx) signal with the transmit (Tx) signal to generate a first combined signal, and a second phase shifter configured to provide a selected phase shift to the first combined signal. The circuit also includes a complex downconverter configured to generate an in phase Rx signal and a quadrature Rx signal, an I/Q amplitude/phase error estimation element configured to determine amplitude and phase error of the in phase Rx signal and quadrature Rx signal, and configured to generate a phase compensation signal ($\varphi'$) and an amplitude compensation signal ($\alpha'$), a first multiplier configured to generate a compensated in phase Rx signal and a second multiplier configured to generate a compensated quadrature Rx signal, a second signal combiner configured to combine the compensated in phase Rx signal and the compensated quadrature Rx signal to generate a frequency independent compensated signal, and a filter (h(t)) configured to generate a frequency dependent compensated signal.

Another aspect of the disclosure provides a method for radio frequency (RF) residual sideband (RSB) calibration including enabling a residual sideband (RSB) signal generation circuit, adjusting a first phase shifter in a signal generation circuit so that a receive (Rx) baseband (BB) in phase signal and a Rx BB quadrature signal have a similar amplitude, setting a second phase shifter to an initial code (dCT+/−Δ), selecting a first (in phase) local oscillator (LO) calibration signal (CAL_LO_I) at the RSB signal generation circuit, responsive to the in phase LO calibration signal (CAL_LO_I), measuring an Rx BB-I output of an in phase baseband filter (BBF I(t)) ($I_{TX}I_{RX}$=A cos($\theta$)) and an Rx BB-Q output of a quadrature baseband filter (BBF Q(t)) ($I_{TX}Q_{RX}$=$\alpha$A cos($\theta-\varphi+90°$)), selecting a second (quadrature) local oscillator (LO) calibration signal (CAL_LO_Q) at the RSB signal generation circuit, responsive to the quadrature LO calibration signal (CAL_LO_Q), measuring the Rx BB-I output of the in phase baseband filter (BBF I(t)) ($Q_{TX}I_{RX}$=A cos($\theta+\varepsilon-90°$)) and the Rx BB-Q output of the quadrature baseband filter (BBF Q(t)) ($Q_{TX}Q_{RX}$=$\alpha$A cos($\theta+\varepsilon-\varphi$)), deriving an Rx I/Q phase error correction factor $\varphi c$, deriving an Rx I/Q gain ratio ac, applying the Rx I/Q phase error correction factor $\varphi c$ and the Rx I/Q gain ratio ac to the Rx BB-I signal and to the Rx BB_Q signal to obtain a frequency independent compensation signal for input to a correction function (h(t)), adjusting the second phase shifter to obtain an additional set of outputs from the in phase baseband filter (BBF I(t)) and the quadrature baseband filter (BBF Q(t)), and combining an adjusted output of the in phase baseband filter (BBF I(t)) after the second phase shifter is adjusted to obtain an additional set of outputs from the in phase baseband filter (BBF I(t)) and the quadrature baseband filter (BBF Q(t)) with an output of the correction function (h(t)) to generate a frequency dependent compensated signal.

Another aspect of the disclosure provides a device for performing radio frequency (RF) residual sideband (RSB) calibration including means for enabling a residual sideband (RSB) signal generation circuit, means for adjusting a first phase shifter in a signal generation circuit so that a receive (Rx) baseband (BB) in phase signal and a Rx BB quadrature signal have a similar amplitude, means for setting a second phase shifter to an initial code (dCT+/−Δ), means for selecting a first (in phase) local oscillator (LO) calibration signal (CAL_LO_I) at the RSB signal generation circuit, means responsive to the in phase LO calibration signal (CAL_LO_I) for measuring an Rx BB-I output of an in phase baseband filter (BBF I(t)) ($I_{TX}I_{RX}$=A cos($\theta$)) and an Rx BB-Q output of a quadrature baseband filter (BBF Q(t)) ($I_{TX}Q_{RX}$=$\alpha$A cos($\theta-\varphi+90°$)), means for selecting a second (quadrature) local oscillator (LO) calibration signal (CAL_LO_Q) at the RSB signal generation circuit, means responsive to the quadrature LO calibration signal (CAL_LO_Q) for measuring the Rx BB-I output of the in phase baseband filter (BBF I(t)) ($Q_{TX}I_{RX}$=A cos($\theta+\varepsilon-90°$)) and the Rx BB-Q output of the quadrature baseband filter (BBF Q(t)) ($Q_{TX}Q_{RX}=\alpha A \cos(\theta+\varepsilon-\varphi)$), means for deriving an Rx I/Q phase error correction factor φc, means for deriving an Rx I/Q gain ratio αc, means for applying the Rx I/Q phase error correction factor φc and the Rx I/Q gain ratio αc to the Rx BB-I signal and to the Rx BB_Q signal to obtain a frequency independent compensation signal for input to a correction function (h(t)), means for adjusting the second phase shifter to obtain an additional set of outputs from the in phase baseband filter (BBF I(t)) and the quadrature baseband filter (BBF Q(t)), and means for combining an adjusted output of the in phase baseband filter (BBF I(t)) after the second phase shifter is adjusted to obtain an additional set of outputs from the in phase baseband filter (BBF I(t)) and the quadrature baseband filter (BBF Q(t)) with an output of the correction function (h(t)) to generate a frequency dependent compensated signal.

Another aspect of the disclosure provides a system for radio frequency (RF) residual sideband (RSB) calibration including a complex (in phase/quadrature (I/Q)) signal receiver, a signal generator configured to generate a transmit (Tx) signal, a first phase shifter operably coupled to the real signal transmitter, the first phase shifter configured to selectively process one of an in phase local oscillator (LO) signal and a quadrature LO signal to create an initial phase between receive in phase (I) and quadrature (Q) signals to create balanced I/Q signals, a first signal combiner configured to combine a receive (Rx) signal with the transmit (Tx) signal to generate a first combined signal, a second phase shifter configured to provide a selected phase shift to the first combined signal, and a complex downconverter configured to generate an in phase Rx signal and a quadrature Rx signal alternatively using the in phase LO signal and the quadrature LO signal to generate one or more signals indicative of relative Tx-Rx LO phase (θ), amplitude (A), Tx LO I/Q phase mismatch (ε), Rx I/Q amplitude mismatch (α), and Rx I/Q phase mismatch (φ) at the output of the complex receiver.

BRIEF DESCRIPTION OF THE DRAWINGS

In the figures, like reference numerals refer to like parts throughout the various views unless otherwise indicated. For reference numerals with letter character designations such as "102a" or "102b", the letter character designations may differentiate two like parts or elements present in the same figure. Letter character designations for reference numerals may be omitted when it is intended that a reference numeral encompass all parts having the same reference numeral in all figures.

DETAILED DESCRIPTION

The word "exemplary" is used herein to mean "serving as an example, instance, or illustration." Any aspect described herein as "exemplary" is not necessarily to be construed as preferred or advantageous over other aspects.

In accordance with an exemplary embodiment, a residual sideband (RSB) calibration (CAL) circuit includes a methodology for calibrating the RSB of a transceiver using a real (BPSK) transmit signal generated by an ultra-wideband (UWB) transmitter.

The AoA and ToA can be determined by analyzing the receive signal residual sideband (RSB), where a phase difference between the Tx signal and Rx signal is used to determine the AoA. The AoA can be determined by analyzing the receive signal phase difference between different antenna chains. To accurately determine the relative phase difference between two receive chains, the RX I/Q mismatch, which may be manifested as RSB or signal images, should be calibrated below the sensitivity level of the receiver, thus, an RSB calibration is desired. There are a number of ways of performing RSB calibration, including factory calibration and a more cost-effective on-chip calibration. Factory calibration is less desired due to its relatively high cost and its inability to track over voltage-temperature variation, thus on-chip calibration is a preferred solution. However, in a UWB radio system, only the receiver is capable of processing a complex signal, the transmitter is capable only of generating a real (BPSK) signal, so conventional on-chip RSB calibration is not possible because there is no complex or single-side-band (SSB) transmit signal available to be injected into the receive path. Further, while ToA is relatively unaffected by I/Q imbalance, AoA is more severely affected by I/Q imbalance, thus making it difficult to determine AoA of the received signal when only a real (BPSK) transmit signal is available.

Figure 1:
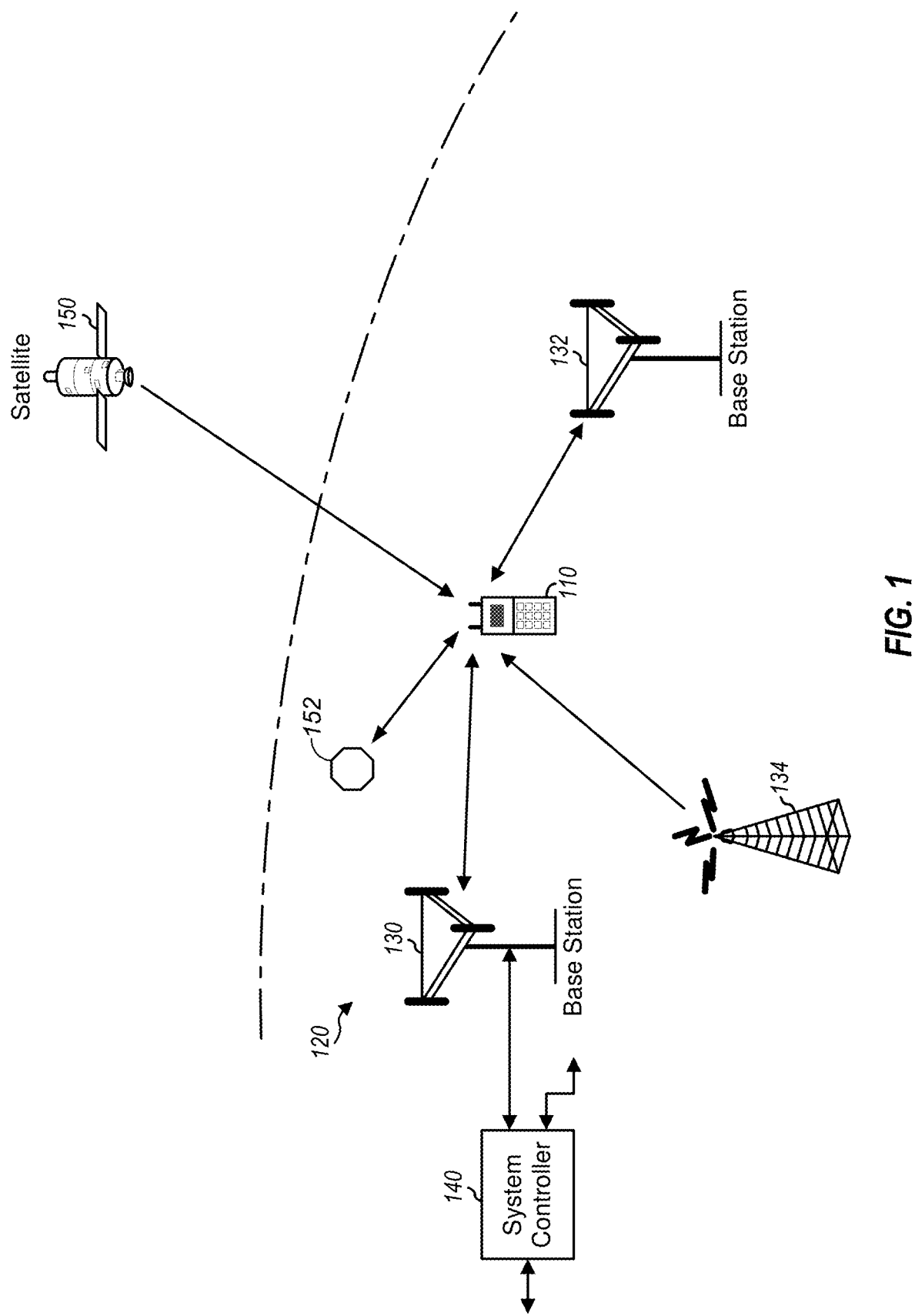
FIG. 1 is a diagram showing a wireless device communicating with a wireless communication system.

FIG. 1 is a diagram showing a wireless device 110 communicating with a wireless communication system 120. The wireless communication system 120 may be a Long Term Evolution (LTE) system, a Code Division Multiple Access (CDMA) system, a Global System for Mobile Communications (GSM) system, a wireless local area network (WLAN) system, a 5G NR (new radio) system, or some other wireless system. A CDMA system may implement Wideband CDMA (WCDMA), CDMA 1x, Evolution-Data Optimized (EVDO), Time Division Synchronous CDMA (TD-SCDMA), or some other version of CDMA. For simplicity, FIG. 1 shows wireless communication system 120 including two base stations 130 and 132 and one system controller 140. In general, a wireless communication system may include any number of base stations and any set of network entities.

The wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a tablet, a cordless phone, a medical device, an automobile, a device configured to connect to one or more other devices (for example through the internet of things), a wireless local loop (WLL) station, a Bluetooth device, etc. Wireless device 110 may communicate with wireless communication system 120. Wireless device 110 may also receive signals from broadcast stations (e.g., a broadcast station 134) and/or may communicate with satellites (e.g., a satellite 150 in one or more global navigation satellite systems (GNSS)), or a satellite that can receive signals from the wireless device 110, etc.). Wireless device 110 may support one or more radio technologies for wireless communication such as LTE, WCDMA, CDMA 1x, EVDO, TD-SCDMA, GSM, 802.11, 802.15, 5G, Sub6 5G, 6G, UWB, etc.

Wireless device 110 may support carrier aggregation, for example as described in one or more LTE or 5G standards. In some embodiments, a single stream of data is transmitted over multiple carriers using carrier aggregation, for example as opposed to separate carriers being used for respective data streams. Wireless device 110 may be able to operate in a variety of communication bands including, for example, those communication bands used by LTE, WiFi, 5G or other communication bands, over a wide range of frequencies. Wireless device 110 may also be capable of communicating directly with other wireless devices without communicating through a network.

In some embodiments, the wireless communication system 120 may include a location device 152 in communication with the wireless device 110. In some embodiments, the location device 152 and the wireless device 110 may include UWB communication technology and the wireless device 110 may use the techniques described herein to determine a location of the location device 152.

Figure 2A:
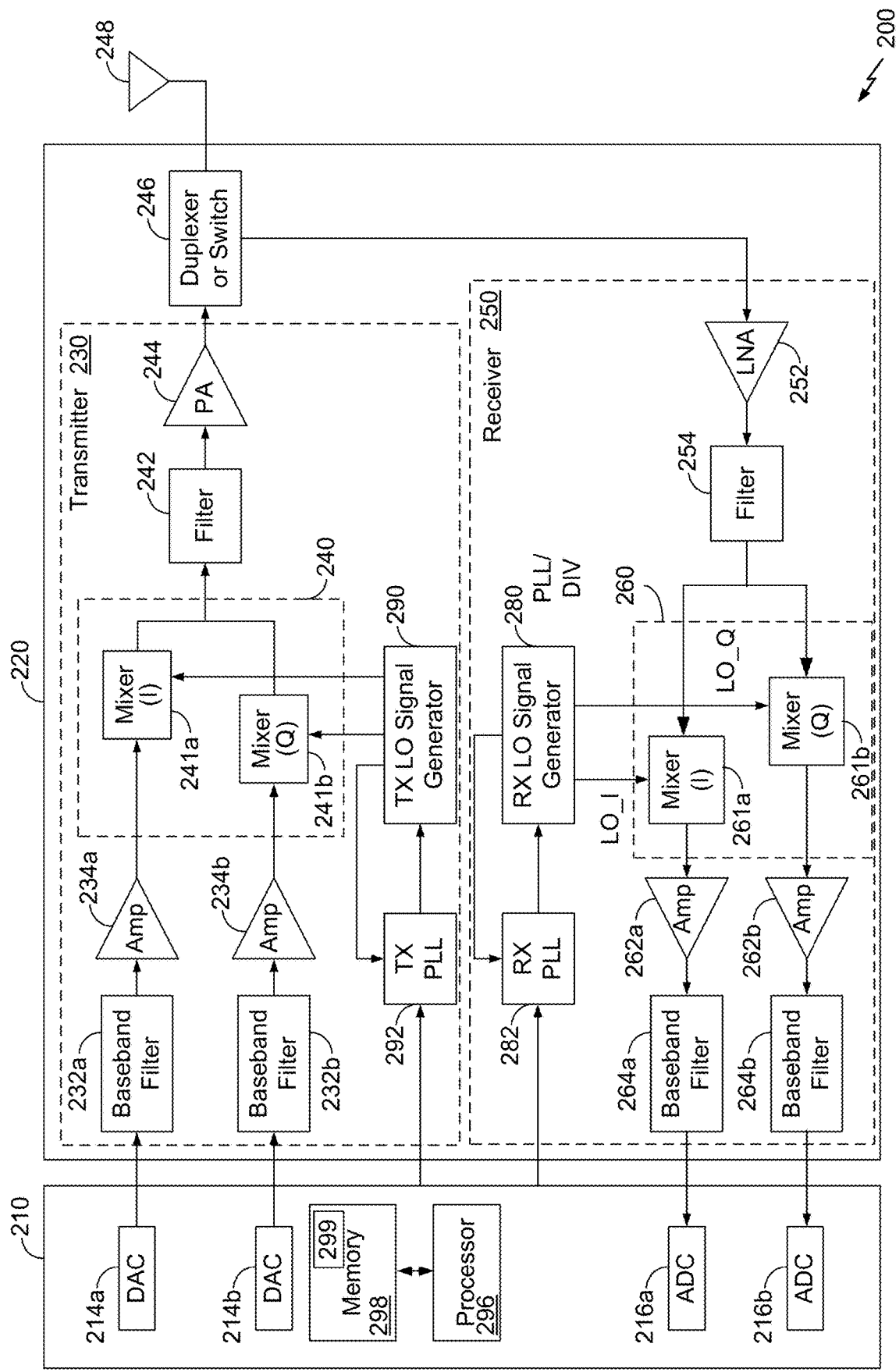
FIG. 2A is a block diagram showing a wireless device in which exemplary techniques of the present disclosure may be implemented.

FIG. 2A is a block diagram showing a wireless device 200 in which exemplary techniques of the present disclosure may be implemented. The wireless device 200 may, for example, be an embodiment of the wireless device 110 illustrated in FIG. 1.

FIG. 2A shows an example of a transceiver 220 having a transmitter 230 and a receiver 250. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2A. Furthermore, other circuit blocks not shown in FIG. 2A may also be used to condition the signals in the transmitter 230 and receiver 250. Unless otherwise noted, any signal in FIG. 2A, or any other figure in the drawings, may be either single-ended or differential. Some circuit blocks in FIG. 2A may also be omitted.

In the example shown in FIG. 2A, wireless device 200 generally comprises the transceiver 220 and a data processor 210. The data processor 210 may include a processor 296 operatively coupled to a memory 298. The memory 298 may be configured to store data and program codes shown generally using reference numeral 299, and may generally comprise analog and/or digital processing components. The processor 296 and the memory 298 may cooperate to control, configure, program, or otherwise fully or partially control some or all of the operation of the embodiments of the residual sideband (RSB) calibration (CAL) circuit described herein.

The transceiver 220 includes a transmitter 230 and a receiver 250 that support bi-directional communication. In general, wireless device 200 may include any number of transmitters and/or receivers for any number of communication systems and frequency bands. All or a portion of the transceiver 220 may be implemented on one or more analog integrated circuits (ICs), RF ICs (RFICs), mixed-signal ICs, etc.

A transmitter or a receiver may be implemented with a super-heterodyne architecture or a direct-conversion architecture. In the super-heterodyne architecture, a signal is frequency-converted between radio frequency (RF) and baseband in multiple stages, e.g., from RF to an intermediate frequency (IF) in one stage, and then from IF to baseband in another stage for a receiver. In the direct-conversion architecture, a signal is frequency converted between RF and baseband in one stage. The super-heterodyne and direct-conversion architectures may use different circuit blocks and/or have different requirements. In the example shown in FIG. 2A, transmitter 230 and receiver 250 are implemented with the direct-conversion architecture.

In the transmit path, the data processor 210 processes data to be transmitted and provides in-phase (I) and quadrature (Q) analog output signals to the transmitter 230. In an exemplary embodiment, the data processor 210 includes digital-to-analog-converters (DAC's) 214a and 214b for converting digital signals generated by the data processor 210 into the I and Q analog output signals, e.g., I and Q output currents, for further processing. In other embodiments, the DACs 214a and 214b are included in the transceiver 220 and the data processor 210 provides data (e.g., for I and Q) to the transceiver 220 digitally.

Within the transmitter 230, baseband (e.g., lowpass) filters 232a and 232b filter the I and Q analog transmit signals, respectively, to remove undesired images caused by the prior digital-to-analog conversion. Amplifiers (Amp) 234a and 234b amplify the signals from baseband filters 232a and 232b, respectively, and provide I and Q baseband signals. An upconverter 240 having upconversion mixers 241a and 241b upconverts the I and Q baseband signals with I and Q transmit (TX) local oscillator (LO) signals from a TX LO signal generator 290 and provides an upconverted signal. A filter 242 filters the upconverted signal to remove undesired images caused by the frequency upconversion as well as noise in a receive frequency band. A power amplifier (PA) 244 amplifies the signal from filter 242 to obtain the desired output power level and provides a transmit RF signal. The transmit RF signal may be routed through a duplexer or switch 246 and transmitted via an antenna 248. While examples discussed herein utilize I and Q signals, those of skill in the art will understand that components of the transceiver may be configured to utilize polar modulation.

In the receive path, antenna 248 receives communication signals and provides a received RF signal, which may be routed through duplexer or switch 246 and provided to a low noise amplifier (LNA) 252. The duplexer 246 is designed to operate with a specific RX-to-TX duplexer frequency separation, such that RX signals are isolated from TX signals. The received RF signal is amplified by LNA 252 and filtered by a filter 254 to obtain a desired RF input signal.

Downconversion mixers 261a and 261b in a downconverter 260 mix the output of filter 254 with I and Q receive (RX) LO signals (i.e., LO_I and LO_Q) from an RX LO signal generator 280 to generate I and Q baseband signals. The I and Q baseband signals are amplified by amplifiers 262a and 262b and further filtered by baseband (e.g., lowpass) filters 264a and 264b to obtain I and Q analog input signals, which are provided to data processor 210. In the exemplary embodiment shown, the data processor 210 includes analog-to-digital-converters (ADC's) 216a and 216b for converting the analog input signals into digital signals to be further processed by the data processor 210. In some embodiments, the ADCs 216a and 216b are included in the transceiver 220 and provide data to the data processor 210 digitally.

In FIG. 2A, TX LO signal generator 290 generates the I and Q TX LO signals used for frequency upconversion, while RX LO signal generator 280 generates the I and Q RX LO signals used for frequency downconversion. Each LO signal is a periodic signal with a particular fundamental frequency. A phase locked loop (PLL) 292 receives a reference clock from a processor or from external clock source and generates a control signal used to adjust the frequency and/or phase of the TX LO signals from LO signal generator 290. Similarly, a PLL 282 receives timing information from data processor 210 and generates a control signal used to adjust the frequency and/or phase of the RX LO signals from LO signal generator 280.

Wireless device 200 may support CA and may (i) receive multiple downlink signals transmitted by one or more cells on multiple downlink carriers at different frequencies and/or (ii) transmit multiple uplink signals to one or more cells on multiple uplink carriers. Those of skill in the art will understand, however, that aspects described herein may be implemented in systems, devices, and/or architectures that do not support carrier aggregation.

Certain components of the transceiver 220 are functionally illustrated in FIG. 2A, and the configuration illustrated therein may or may not be representative of a physical device configuration in certain implementations. For example, as described above, transceiver 220 may be implemented in various integrated circuits (ICs), RF ICs (RFICs), mixed-signal ICs, etc. In some embodiments, the transceiver 220 is implemented on a substrate or board such as a printed circuit board (PCB) having various modules, chips, and/or components. For example, the power amplifier 244, the filter 242, and the duplexer 246 may be implemented in separate modules or as discrete components, while the remaining components illustrated in the transceiver 220 may be implemented in a single transceiver chip.

The power amplifier 244 may comprise one or more stages comprising, for example, driver stages, power amplifier stages, or other components, that can be configured to amplify a communication signal on one or more frequencies, in one or more frequency bands, and at one or more power levels. Depending on various factors, the power amplifier 244 can be configured to operate using one or more driver stages, one or more power amplifier stages, one or more impedance matching networks, and can be configured to provide good linearity, efficiency, or a combination of good linearity and efficiency.

In an exemplary embodiment in a super-heterodyne architecture, the PA 244 and LNA 252 (and filter 242 and filter 254 in some examples) may be implemented separately from other components in the transmitter 230 and receiver 250, for example on a millimeter wave integrated circuit. An example super-heterodyne architecture is illustrated in FIG. 2B.

Figure 2B:
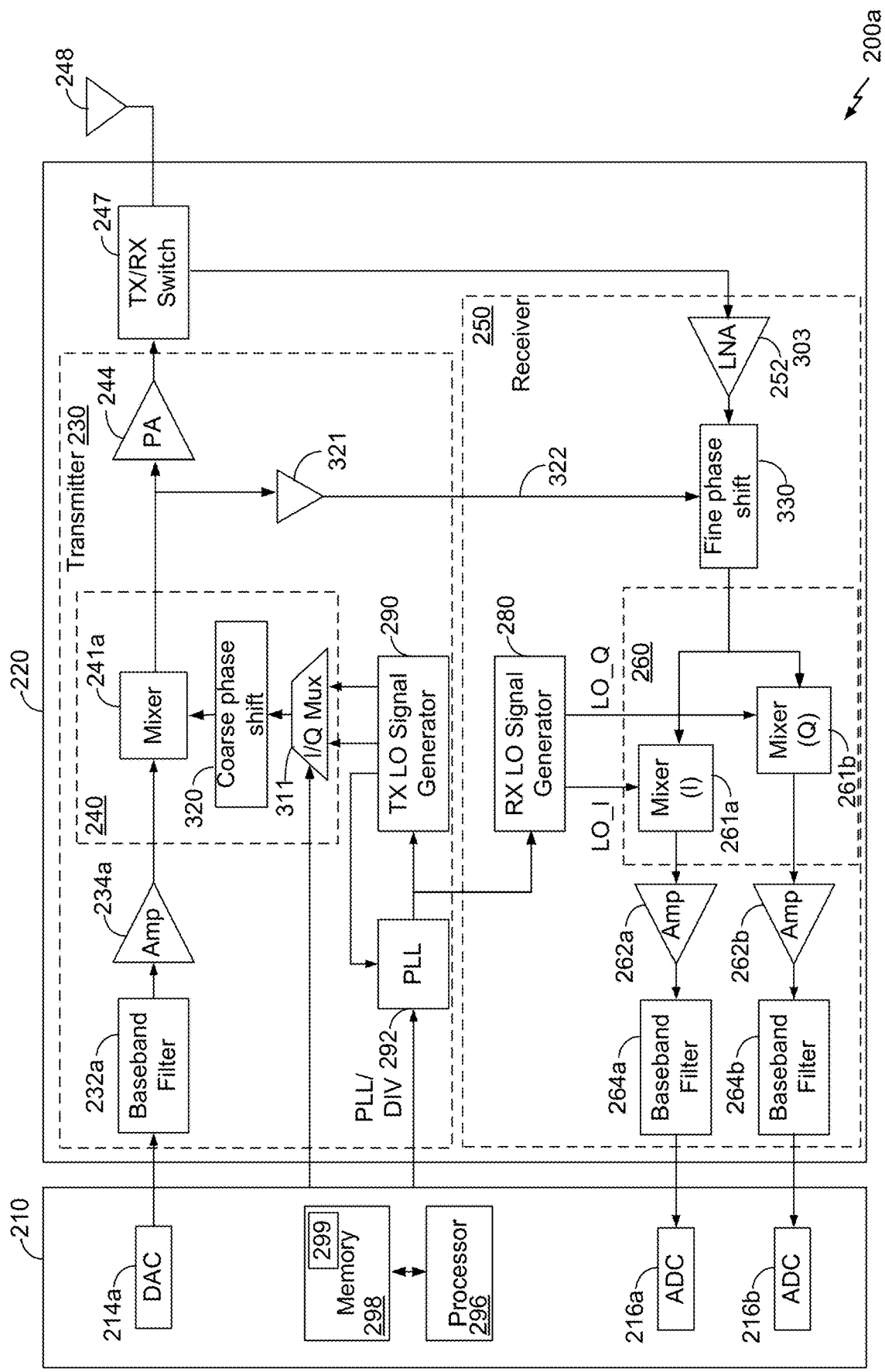
FIG. 2B is a block diagram showing a wireless device in which exemplary techniques of the present disclosure may be implemented.

FIG. 2B is a block diagram showing a wireless device in which exemplary techniques of the present disclosure may be implemented.

FIG. 2B shows an example of a transceiver 220a having a transmitter 230 and a receiver 250. In general, the conditioning of the signals in the transmitter 230 and the receiver 250 may be performed by one or more stages of amplifier, filter, upconverter, downconverter, etc. These circuit blocks may be arranged differently from the configuration shown in FIG. 2B. Furthermore, other circuit blocks not shown in FIG. 2B may also be used to condition the signals in the transmitter 230 and receiver 250. Unless otherwise noted, any signal in FIG. 2B, or any other figure in the drawings, may be either single-ended or differential. Some circuit blocks in FIG. 2B may also be omitted. In an exemplary embodiment, the transceiver 220a may comprise an ultra-wideband (UWB) transmitter that may be implemented in, for example, a wireless communication device and in a positioning or locating device that may accurately estimate the distance between two UWB equipped devices. The determination of an AoA can be used in a positioning or locating device to accurately determine the device's position or location.

In FIG. 2B, an implementation is shown having a UWB transmitter 230. In the example shown in FIG. 2B, wireless device 200a generally comprises the transceiver 220a and a data processor 210. The data processor 210 may include a processor 296 operatively coupled to a memory 298. The memory 298 may be configured to store data and program codes shown generally using reference numeral 299, and may generally comprise analog and/or digital processing components. The processor 296 and the memory 298 may cooperate to control, configure, program, or otherwise fully or partially control some or all of the operation of the embodiments of the residual sideband (RSB) calibration (CAL) circuit described herein.

The transceiver 220 includes a transmitter 230 and a receiver 250 that support bi-directional communication. In general, wireless device 200a may include any number of transmitters and/or receivers for any number of communication systems and frequency bands. All or a portion of the transceiver 220a may be implemented on one or more analog integrated circuits (ICs), RF ICs (RFICs), mixed-signal ICs, etc.

In the transmit path, the data processor 210 processes data to be transmitted and provides in-phase (I) or quadrature (Q) analog output signals to the transmitter 230. In an exemplary embodiment, the data processor 210 includes digital-to-analog-converter (DAC) 214a for converting digital signals generated by the data processor 210 into the I or Q analog output signals, e.g., I or Q output currents, for further processing. In other embodiments, the DAC 214a is included in the transceiver 220 and the data processor 210 provides data (e.g., for I or Q) to the transceiver 220 digitally.

Within the transmitter 230, baseband (e.g., lowpass) filter 232a filters the I or Q analog transmit signals, respectively, to remove undesired images caused by the prior digital-to-analog conversion. Amplifier (Amp) 234a amplifies the signals from baseband filter 232a and provides I or Q baseband signals. An upconverter 240 having upconversion mixer 241a, an I/Q mux 311 and a coarse phase shifter 320 upconverts the I or Q baseband signals with I or Q transmit (TX) local oscillator (LO) signals from a TX LO signal generator 290 and provides an upconverted signal.

In an exemplary embodiment, a single PLL 292 provides a frequency reference signal to the TX LO signal generator 290 and to the RX LO signal generation 280. The TX LO signal generator 290 provides I and Q LO signals to the I/Q mux 311. The I/Q mux selects either the I LO signal or the Q LO signal based on a control signal supplied by the data processor 210 or another controller. Either the I LO signal or the Q LO signal is provided to the coarse phase shifter 320.

The coarse phase shifter 320 applies a coarse phase shift to delay the phase of the selected signal from the I/Q mux 311 and provides an output to the mixer 241a. The output of the mixer 241a is provided to an amplifier 321 and to a power amplifier 244. The amplifier 321 may provide a signal loopback function and provides either the I or Q output of the mixer 241a as a current mode TX to RX loopback TX to RX signal to the fine phase shifter 330 over connection 322. In an exemplary embodiment, the fine phase shifter 330 appears as a load of the LNA 252 in the receiver 250. The load provided by the fine phase shifter 330 may be in the form of an inductive (L) capacitive (C) (LC) tank circuit, and thus appears as an impedance, which converts the current signal provided by the amplifier 321 to a voltage signal at the input to the downconverter 260. The signal provided by the amplifier 321 is "on-chip" so that an accurate analysis of the signal provided by the mixer 241a can be performed as will be described below.

The power amplifier (PA) 244 amplifies the signal from the mixer 241a to obtain the desired output power level and provides a transmit RF signal. The transmit RF signal may be routed through a TX/RX switch 247 and transmitted via an antenna 248. While examples discussed herein utilize I and Q signals, those of skill in the art will understand that components of the transceiver may be configured to utilize polar modulation. In an exemplary embodiment, the amplifier 321 provides an amplified signal to the receiver 250.

In the receive path, antenna 248 receives communication signals and provides a received RF signal, which may be routed through the TX/RX switch 247 and provided to a low noise amplifier (LNA) 252. The TX/RX switch 247 is designed to operate such that RX signals are isolated from TX signals. The received RF signal is amplified by LNA 252 and phase/sifted and filtered by a fine phase shifter 330. In an exemplary embodiment, the fine phase shifter 330 may comprise an inductive (L) capacitive (C) circuit, sometimes referred to as an LC tank circuit that provides filtering and phase shifting as will be described in greater detail below. An output of the fine phase shifter 330 is provided to a downconverter 260.

Downconversion mixers 261a and 261b in the downconverter 260 mix the output of filter 254 with I and Q receive (RX) LO signals (i.e., LO_I and LO_Q) from an RX LO signal generator 280 to generate I and Q baseband signals. The I and Q baseband signals are amplified by amplifiers 262a and 262b and further filtered by baseband (e.g., low-pass) filters 264a and 264b to obtain I and Q analog input signals, which are provided to data processor 210. In the exemplary embodiment shown, the data processor 210 includes analog-to-digital-converters (ADC's) 216a and 216b for converting the analog input signals into digital signals to be further processed by the data processor 210. In some embodiments, the ADCs 216a and 216b are included in the transceiver 220 and provide data to the data processor 210 digitally.

In FIG. 2B, TX LO signal generator 290 generates the I and Q TX LO signals used for frequency upconversion, while RX LO signal generator 280 generates the I and Q RX LO signals used for frequency downconversion. Each LO signal is a periodic signal with a particular fundamental frequency. A phase locked loop (PLL) 292 receives timing information from data processor 210 and generates a control signal used to adjust the frequency and/or phase of the TX LO signals from LO signal generator 290 and adjust the frequency and/or phase of the RX LO signals from LO signal generator 290.

Figure 3A:
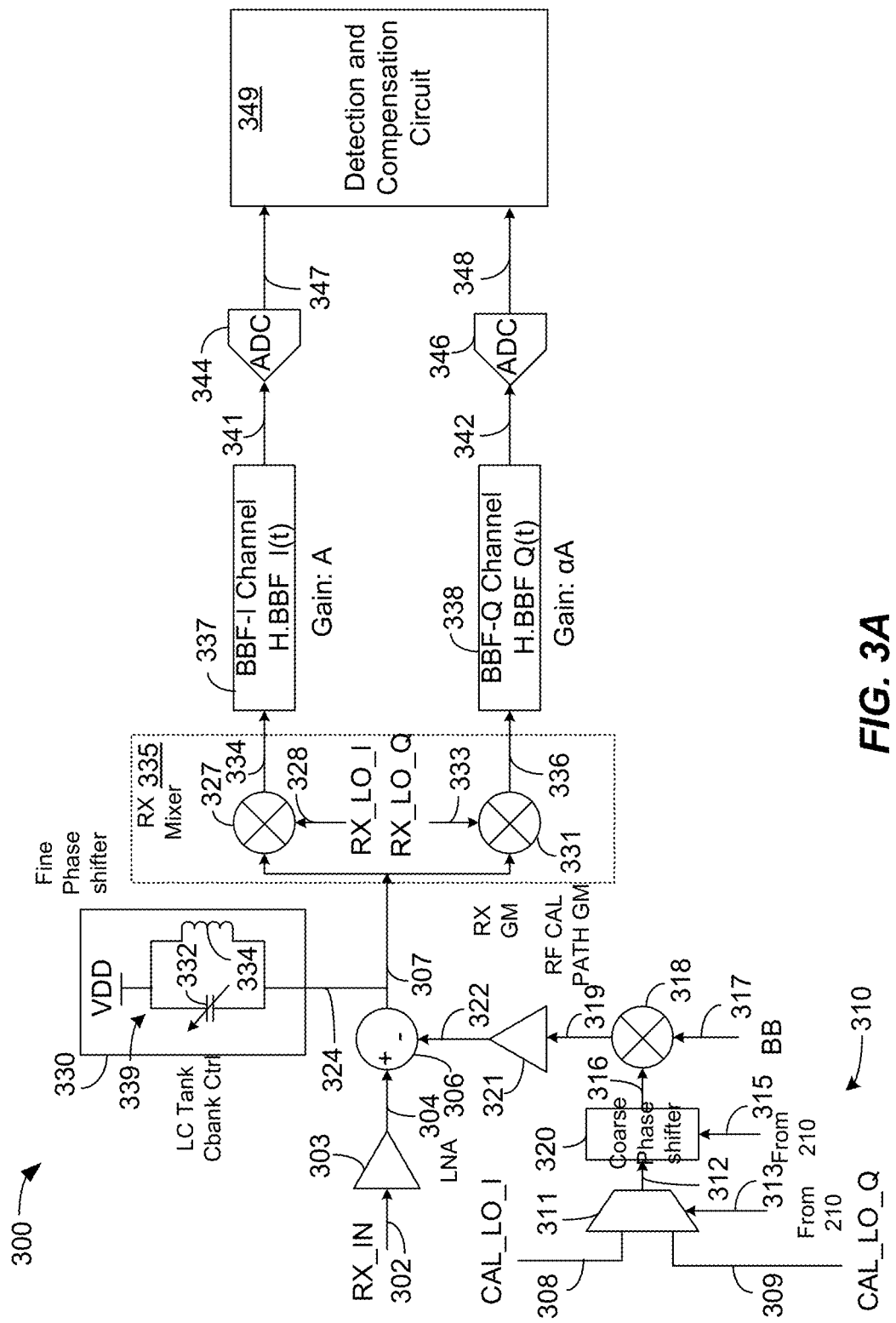
FIG. 3A shows a schematic diagram of a portion of a radio frequency integrated circuit (RFIC) having a residual sideband (RSB) calibration circuit.

FIG. 3A shows a schematic diagram of a portion of a radio frequency integrated circuit (RFIC) having a residual sideband (RSB) calibration (CAL) circuit. In an exemplary embodiment, the RSB CAL circuit 300 may be located in or as part of the transceiver 220 of FIG. 2A or 2B. In an exemplary embodiment, the RSB CAL circuit 300 includes a low noise amplifier (LNA) 303 configured to receive a receive (Rx) signal over connection 302. An amplified Rx signal is provided by the LNA 303 over connection 304 to a signal combiner 306.

In an exemplary embodiment, the RSB CAL circuit 300 also includes an RSB transmit (Tx) circuit 310. The RSB Tx circuit 310 includes a multiplexer 311 configured to receive an in phase calibration local oscillator (LO) signal (CAL_LO_I) over connection 308 and a quadrature calibration local oscillator (LO) signal (CAL_LO_Q) over connection 309. The CAL_LO_I signal and the CAL_LO_Q signal may be provided by the Tx LO signal generator 290 of FIG. 2A or 2B, or by another LO circuit. The multiplexer 311 selects whether the CAL_LO_I signal or the CAL_LO_Q signal is provided over connection 312 based on a control signal on connection 313 provided by the data processor 210 or another controller. In an exemplary embodiment, the RSB transmit (Tx) circuit 310 may be referred to as a signal generator when performing RSB calibration as described herein.

The CAL_LO_I signal or the CAL_LO_Q signal is provided to a coarse phase shifter 320. The coarse phase shifter 320 applies a phase shift to the signal on connection 312 and provides an output over connection 316 to a mixer 318. The phase shift applied by the coarse phase shifter 320 may be controlled by a control signal applied over connection 315 from the data processor 210 (FIG. 2A or 2B) or another controller. In an exemplary embodiment, the coarse phase shifter 320 may be implemented using an adjustable-delay buffer, a low-pass resistive (R) capacitive (C) (RC) filter or another circuit. The coarse phase shifter 320 adjusts the TX-RX relative phase to obtain an optimized phase setting when both RX I and RX Q signals are at a similar amplitude, which indicates that the relative phase between TX and RX is close to 45 degree*N, where N is any integer and is an arbitrary number, since it will keep rotating from 0 to 2pi and back to 0. The mixer 318 receives a baseband (BB) bi-phase shift keying (BPSK) transmit signal over connection 317 and provides an upconverted BPSK signal over connection 319. The signal on connection 319 is the BB BPSK signal on connection 317 upconverted based on the frequency of the CAL_LO_I signal or the CAL_LO_Q signal. The Tx signal on connection 319 is amplified by an amplifier 321 and provided over connection 322 to the signal combiner 306.

The signal combiner 306 combines the complex Rx signal on connection 304 with the real Tx signal on connection 322 and provides a combined signal over connection 307. The combined signal on connection 307 is provided to a downconverter circuit 335. In an exemplary embodiment, a fine phase shifter 330 is also connected to the output of the signal combiner 306 over connection 324. In an exemplary embodiment, the fine phase shifter 330 comprises an inductive (L) capacitive (C) circuit, sometimes referred to as an LC tank circuit. The fine phase shifter 330 provides a fine phase tuning stage by adjusting its L/C values. In an exemplary embodiment, the fine phase shifter 330 may change among inductive, real, and capacitive impedance to provide slight phase shift from its initial value. In an exemplary embodiment, the fine phase shifter 330 is a band pass filter (BPF), and is also an impedance and a current mode signal combiner. In an exemplary embodiment, the fine phase shifter 330 includes an LC tank circuit 339 having an adjustable capacitance 332 and an inductance 334. The adjustable capacitance 332 may be adjusted based on a control signal provided by the data processor 210 or another controller. The operation of the coarse phase shifter 320 and the fine phase shifter 330 will be described in greater detail below.

The amplified combined signal on connection 307 is provided to a downconverter circuit 335. The downconverter circuit 335 may include an in phase mixer 327 and a quadrature mixer 331. The in phase mixer 327 may receive an in phase Rx_LO_I signal over connection 328 and the quadrature mixer 331 may receive a quadrature Rx_LO_Q signal over connection 333. An output of the in phase mixer 327 is provided over connection 334 to an in phase baseband filter (BBF I(t)) 337; and an output of the quadrature mixer 331 is provided over connection 336 to a quadrature baseband filter (BBF Q(t)) 338.

An output of the (BBF I(t)) 337 is provided over connection 341 to an analog-to-digital converter (ADC) 344 and an output of the (BBF Q(t)) 338 is provided over connection 342 to an ADC 346. The digital output of the ADC 344 is provided over connection 347 and the digital output of the ADC 346 is provided over connection 348. The signals on connections 347 and 348 are further processed by a digital detection and compensation circuit 349 as will be described below.

Figure 3B:
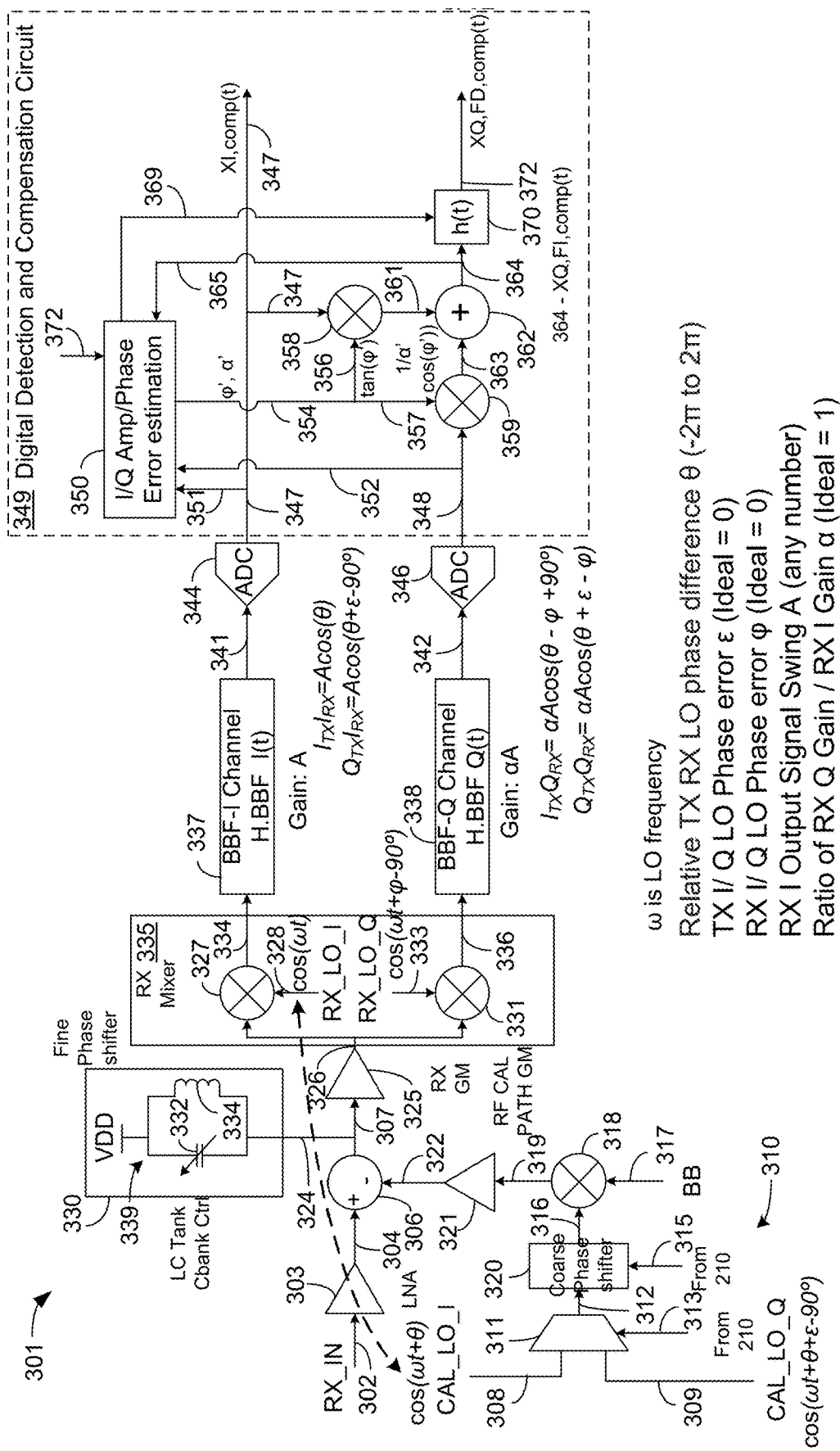
FIG. 3B shows a schematic diagram of a more detailed view of the portion of the radio frequency integrated circuit (RFIC) having a residual sideband (RSB) calibration circuit of FIG. 3A.

FIG. 3B shows a schematic diagram of a portion of a radio frequency integrated circuit (RFIC) 301 having a residual sideband (RSB) calibration (CAL) circuit of FIG. 3A. In an exemplary embodiment, the RSB CAL circuit 301 may be located in or as part of the transceiver 220 of FIG. 2A or 2B. In an exemplary embodiment, the RSB CAL circuit 300 includes a low noise amplifier (LNA) 303 configured to receive a receive (Rx) signal over connection 302. An amplified Rx signal is provided by the LNA 303 over connection 304 to a signal combiner 306.

In an exemplary embodiment, the RSB CAL circuit 300 also includes an RSB transmit (Tx) circuit 310. The RSB Tx circuit 310 includes a multiplexer 311 configured to receive an in phase calibration local oscillator (LO) signal (CAL_LO_I) over connection 308 and a quadrature calibration local oscillator (LO) signal (CAL_LO_Q) over connection 309. The CAL_LO_I signal and the CAL_LO_Q signal may be provided by the Tx LO signal generator 290 of FIG. 2A or 2B, or by another LO circuit. The multiplexer 311 selects whether the CAL_LO_I signal or the CAL_LO_Q signal is provided over connection 312 based on a control signal on connection 313 provided by the data processor 210 or another controller.

The CAL_LO_I signal or the CAL_LO_Q signal is provided to a coarse phase shifter 320. The coarse phase shifter 320 applies a phase shift to the signal on connection 312 and provides an output over connection 316 to a mixer 318. The phase shift applied by the coarse phase shifter 320 may be controlled by a control signal applied over connection 315 from the data processor 210 (FIG. 2A or 2B) or another controller. In an exemplary embodiment, the coarse phase shifter 320 may be implemented using an adjustable-delay buffer, a programmable low-pass resistive (R) capacitive (C) (RC) filter or another circuit. The coarse phase shifter 320 adjusts the TX-RX relative phase to obtain an optimized setting when both RX I and RX Q signals are at a similar amplitude, which indicates that the relative phase between TX and RX is close to 45 degree*N, where N is 0, 90, 180 or 270 degrees. The mixer 318 receives a baseband (BB) bi-phase shift keying (BPSK) transmit signal over connection 317 and provides an upconverted BPSK signal over connection 319. The signal on connection 319 is the BB BPSK signal on connection 317 upconverted based on the frequency of the CAL_LO_I signal or the CAL_LO_Q signal. The Tx signal on connection 319 is amplified by an amplifier 321 and provided over connection 322 to the signal combiner 306.

The signal combiner 306 combines the complex Rx signal on connection 304 with the real Tx signal on connection 322 and provides a combined signal over connection 307. The combined signal on connection 307 is provided to a Rx amplifier 325. In an exemplary embodiment, a fine phase shifter 330 is also connected to the output of the signal combiner 306 over connection 324. In an exemplary embodiment, the fine phase shifter 330 comprises an inductive (L) capacitive (C) circuit, sometimes referred to as an LC tank circuit. In an exemplary embodiment, the fine phase shifter 330 includes an LC tank circuit 339 having an adjustable capacitance 332 and an inductance 334. The adjustable capacitance 332 may be adjusted based on a control signal provided by the data processor 210 or another controller. The fine phase shifter 330 provides a fine phase tuning stage by adjusting the values of the capacitance 332 and the inductance 334. In an exemplary embodiment, the fine phase shifter 330 may change among inductive, real, and capacitive impedance to provide slight phase shift from its initial value. In an exemplary embodiment, the fine phase shifter 330 is a band pass filter (BPF), and is also an impedance and a current mode signal combiner. The operation of the coarse phase shifter 320 and the fine phase shifter 330 will be described in greater detail below.

The amplified combined signal on connection 326 is provided to a downconverter circuit 335. The downconverter circuit 335 may include an in phase mixer 327 and a quadrature mixer 331. The in phase mixer 327 may receive an in phase Rx_LO_I signal over connection 328 and the quadrature mixer 331 may receive a quadrature Rx_LO_Q signal over connection 333. An output of the in phase mixer 327 is provided over connection 334 to an in phase baseband filter (BBF I(t)) 337; and an output of the quadrature mixer 331 is provided over connection 336 to a quadrature baseband filter (BBF Q(t)) 338.

An output of the (BBF I(t)) 337 is provided over connection 341 to an analog-to-digital converter (ADC) 344 and an output of the (BBF Q(t)) 338 is provided over connection 342 to an ADC 346. The digital output of the ADC 344 is provided over connection 347 and the digital output of the ADC 346 is provided over connection 348.

In an exemplary embodiment, the digital signal on connection 347 and the digital signal on connection 348 is provided to an I/Q amplitude/phase error estimation element 350 over respective connections 351 and 352. In an exemplary embodiment where the Q signal path is being compensated, the output of the ADC 344 on connection 347, XI,comp(t), may be used as a reference signal when compensating the output of the ADC 346 on connection 348. The I/Q amplitude/phase error estimation element 350 provides amplitude and phase correction signals ($\varphi'$ and $\alpha'$) over connections 354, 356 and 357 and will be described in greater detail below. In an exemplary embodiment, the processing performed by the I/Q amplitude/phase error estimation element 350 may be performed by the processor 296 or another processor.

In an exemplary embodiment, the digital signal on connection 347 is provided to a multiplier 358. The digital signal on connection 347 also represents the in phase signal correction function, XI,comp(t). In an exemplary embodiment, the digital signal on connection 348 is provided to a multiplier 359. The output of the multiplier 359 is provided over connection 363 to a signal combiner 362. An output of the multiplier 358 is also provided to the signal combiner 362.

In an exemplary embodiment, the multiplier 358 multiplies (or performs the multiplication of) the XI,comp(t) signal on connection 347 with the correction function tan($\varphi'$) on connection 356. The output of the multiplier 358 on connection 361 comprises a corrected XI,comp(t) signal. The signal on connection 361 represents a digital signal, for example, an 8-bit signal at a 998.4 MHz clock rate, in which the output of the ADC 344 on connection 347 is corrected by the correction function tan($\varphi'$) on connection 356.

In an exemplary embodiment, the multiplier 359 multiplies the Q output of the ADC 346 on connection 348 with the correction function $1/\alpha'\cos(\varphi')$ on connection 357. The signal on connection 363 represents a digital signal, for example, an 8-bit signal at a 998.4 MHz clock rate, in which the output of the ADC 346 on connection 348 is corrected by the correction function $1/\alpha'\cos(\varphi')$ on connection 357.

The signal combiner 362 combines the signal on connection 361 with the signal on connection 363. An output of the signal combiner 362 is provided over connection 365 to the I/Q amplitude/phase error estimation element 350 and is provided over connection 364 to a correction function (h(t)) 370. In an exemplary embodiment, the signal on connections 364 and 365 represents a frequency independent (FI) correction signal XQ,FI,comp(t). In an exemplary embodiment, the output of the signal combiner 362 on connection 365 is compared again to the signal on connection 347 by the 350 I/Q amplitude/phase error estimation element 350. The I/Q amplitude/phase error estimation element 350 then provides a frequency dependent corrected signal over connection 369 back to the correction function (h(t)) 370. The correction function (h(t)) 370 will equalize the I and Q signals based on frequency and provide a frequency-dependent compensated signal, XQ,FD,comp(t), signal over connection 372. The XQ,FD,comp(t) signal on connection 372 is also fed back to the I/Q amplitude/phase error estimation element 350. The I/Q amplitude/phase error estimation element 350 processes the XQ,FD,comp(t) signal on connection 372 by performing an adaptive digital filter process to adapt the filter coefficients of the correction function (h(t)) 370, XQ,FD,comp(t), as close as possible to the reference signal, XI,comp(t) on connection 347.

An output of the correction function (h(t)) 370 represents the quadrature correction signal, XQ,FD,comp(t), and is provided over connection 372. The output on connection 347 is the signal XIcomp(t). The signals on connections 347 and 372 may be provided to the data processor 210 (or a digital modem) for further processing to determine the ToA and the AoA.

Although shown as being in the "Q" path, the correction function (h(t)) 370 may also be located in the "I" path in some embodiments, and in other embodiments, portions of the correction function (h(t)) 370 may be located in both the "Q" path and in the "I" path.

In an exemplary embodiment, the RSB can be calibrated using the real BPSK Tx signal by solving for a number of variables that can be generated by combining the BB BPSK signal on connection 317 upconverted alternatively by either the CAL_LO_I signal or the CAL_LO_Q signal with the receive signal provided by the LNA 303. Multiple equations having the variables listed below can be generated by alternating the CAL_LO_I signal and the CAL_LO_Q signal over multiple iterations. The variables are:

θ is the relative Tx-Rx LO phase.
A is the amplitude.
ε is the Tx LO I/Q phase mismatch.
α is the Rx I/Q amplitude mismatch.
φ is the Rx I/Q phase mismatch.

The variable θ indicates the relative phase difference between the Tx signal and the Rx signal). The term "θ" refers to the Tx-Rx LO phase difference at the carrier frequency, and from θ the phase difference between the TX and RX can be determined and is approximated by c*θ/2pi*Fc*N, where c is the speed of light, Fc is carrier frequency, and N is an integer number. The number N can be an arbitrary number, since it will keep rotating from 0 to 2pi and back to 0. The TX could be a transmit source from a distant place, and the RX could be a handheld device with two (2) or more receivers and associated antennas. If the two (2) receivers are close enough, say, less than 0.5/2*pi*Fc, then the N will be the same thus the TX-RX distance difference between these two antenna paths can be determined, and since the distance between two (2) antennas is known (the device manufacturer knows the distance between antennas) the 2D angle of arrival (AoA) can be determined. With a third antenna, the 3D angle (and the AoA) can also be determined. I/Q error occurs at RX I and RX Q. A UWB transmitter only uses either I or Q, thus I/Q mismatch is not an issue in a UWB transmitter because only a real (bi-phase) signal is transmitted Since the TX I and Q clock are sued as a calibration source and since they are not perfectly 90 degrees apart, TX I and TX Q error should be determined so it is not included in the RX I/Q error estimation, which might result in an over-compensation of the I/Q at RX based on the wrong estimation. Referring back to the RX I/Q error estimation, this I/Q error will limit the ability to determine the TX-RX phase difference and knowing the relative TX-RX phase is important when determining the AoA. Minimizing I/Q phase error (or imbalance) can improve the accuracy of the AoA determination.

In an exemplary embodiment, for the transmit signal the coarse phase shifter 320 is used to create as close to a 45° phase difference (θ) between the CAL_LO_I signal and CAL_LO_Q signal to maximize the signal swing (amplitude of the voltage swing) of the CAL_LO_I signal and CAL_LO_Q signal. In an exemplary embodiment, the control code provided by the data processor 210 (FIG. 2A or 2B or another controller) to the coarse phase shifter 320 is swept until RXBB-I (at the in phase baseband filter (BBF I(t)) 337) and RXBB_Q (at the quadrature baseband filter (BBF Q(t)) 338) have a similar amplitude, implying that θ (the relative Tx-Rx LO phase difference) is close to 45° and both I and Q have maximum signal-to-noise ratio (SNR).

In an exemplary embodiment, tuning the phase delay with the coarse phase shifter 320 and the fine phase shifter 330 will change the relative Tx-Rx LO phase difference θ and will change the amplitude A. In an exemplary embodiment, tuning the phase delay with the coarse phase shifter 320 and the fine phase shifter 330 may change the Tx LO I/Q phase mismatch ε. In an exemplary embodiment, tuning the phase delay with the coarse phase shifter 320 and the fine phase shifter 330 will not change the Rx I/Q amplitude mismatch a and will not change the Rx I/Q phase mismatch φ.

In an exemplary embodiment, once the coarse phase shifter 320 sets θ as close to a 45° as possible, then the control code provided by the data processor 210 (FIG. 2A or 2B, or another controller) to the fine phase shifter 330 sets the fine phase shifter 330 based on dCT+/−Δ. The term dCT refers to a digital capacitance tuning code, d_cap_tuning_code. For example, the LC tank circuit 339 is set based on dCT+/−Δ. For example, the impedance of the fine phase shifter 330 can be represented as R+jX, in which R is the real part and X is the imaginary part of the impedance. The phase of this impedance can be represented as arctan(X/R). When the value of the capacitance 332 is changed (through cap bank tuning for example), both R and X will slightly change, so the phase change is represented by arctan(X+dX/R+dR)−arctan(X/R)=Δθfine. The RX will have a default code to keep it resonant at in-band, for example, 8 GHz. That code can be specified as d_cap_tuning_code. During this fine phase tuning stage, the code can be changed by plus 1 or minus 1 or a small delta in order to provide a slight phase difference to generate more equations than unknowns.

In an exemplary embodiment, the CAL_LO_I signal on connection 308 is selected and the BB BPSK transmit signal upconverted by the CAL_LO_I signal is provided to the signal combiner 306. The Tx signal propagates through the Rx amplifier 325 and the Rx signal is measured at the in phase baseband filter (BBF I(t)) 337 and at the quadrature baseband filter (BBF I(t)) 338. In an exemplary embodiment, for the CAL_LO_I signal, the in phase baseband filter (BBF I(t)) 337 produces an output $I_{TX}I_{RX}$=A cos(θ) and the quadrature baseband filter (BBF Q(t)) 338 produces an output $I_{TX}Q_{RX}$=αA cos(θ−φ+90°).

Next, the in phase (I) LO input to the mixer 318 is swapped to the quadrature (Q) LO input and the CAL_LO_Q signal on connection 309 is selected and the BB BPSK transmit signal is provided to the signal combiner 306. The Tx signal propagates through the Rx amplifier 325 and the Rx signal is measured at the in phase baseband filter (BBF I(t)) 337 and at the quadrature baseband filter (BBF I(t)) 338. In an exemplary embodiment, for the CAL_LO_Q signal, the in phase baseband filter (BBF I(t)) 337 produces an output $Q_{TX}I_{RX}$=A cos(θ+ε−90°) and the quadrature baseband filter (BBF Q(t)) 338 produces an output $Q_{TX}Q_{RX}$=αA cos(θ+ε−φ).

In this manner the following four equations are generated:

$$I_{TX}I_{RX} = A\cos(\theta)$$

$$I_{TX}Q_{RX} = \alpha A\cos(\theta - \varphi + 90°).$$

$$Q_{TX}I_{RX} = A\cos(\theta + \varepsilon - 90°)$$

$$Q_{TX}Q_{RX} = \alpha A\cos(\theta + \varepsilon - \varphi)$$

Next it is determined whether there are more result equations than unknowns. If there are more unknowns than result equations, then the fine phase shifter 330 is adjusted based on dCT+/−Δ (i.e., the adjustable component(s) in the fine phase shifter 330 are set to a different value to select a different phase) and the above steps are repeated to generate additional result equations generated after adjusting the fine phase shifter 330 to a different phase.

After two iterations of the above the following eight (8) equations are available to solve for the unknowns $\theta_0$, $\theta_1$ ε, φ, α, $A_0$, $A_1$:

$$A_0\cos(\theta_0) = I_{TX}I_{RX}0$$

$$A_1\cos(\theta_1) = I_{TX}I_{RX}1$$

$$A_0\cos(90° + \theta_0 + \varepsilon) = Q_{TX}I_R 0$$

-continued $$A_1\cos(90° + \theta_1 + \varepsilon) = Q_{TX}I_{RX}1$$

$$\alpha A_0\cos(90° + \varphi - \theta_0) = I_{TX}Q_R 0$$

$$\alpha A_1\cos(90° + \varphi - \theta_1) = I_{TX}Q_{RX}1$$

$$\alpha A_0\cos(\theta_0 + \varepsilon - \varphi) = Q_{TX}Q_R 0$$

$$\alpha A_1\cos(\theta_1 + \varepsilon - \varphi) = Q_{TX}Q_{RX}1$$

Next, the above eight (8) equations are solved to find values for the following unknowns $\theta_0$, $\theta_1$ ε, φ, α, $A_0$, $A_1$. In an exemplary embodiment, an iterative method may be used to solve for the unknowns $\theta_0$, $\theta_1$ ε, φ, α, $A_0$, $A_1$ as follows.

For example, in a first iterative step, $\theta_{0,1}$ and $A_{0,1}$ may be estimated. A first "seed" $\theta_{0,1}$ and $A_{0,1}$ may be estimated assuming the mismatch terms (α, ε) are closed to (1, 0). Knowing α, ε, θ, and an approximation for A, φ can be solved from $\alpha A_0$ $\cos(\theta_0+\varepsilon-\varphi)=Q_{TX}Q_{RX}0 \to$ arccos $(Q_{TX}Q_{RX}0/\alpha/A0)-\varepsilon-\theta_0$.

This yields:

$$A_0\cos(\theta_0) = I_{TX}I_{RX}0$$

$$A_0\cos(90° + \theta_0) = Q_{TX}I_{RX}0$$

$$\tan(\theta_0) = Q_{TX}I_{RX}0/I_{TX}I_{RX}0$$

$$\theta_0 = \tan^{-1}(Q_{TX}I_{RX}0/I_{TX}I_{RX}0)$$

and $$A_1\cos(\theta_1) = I_{TX}I_{RX}1$$

$$A_1\cos(90° + \theta_1) = Q_{TX}I_{RX}1$$

$$\tan(\theta_1) = Q_{TX}I_{RX}1/I_{TX}I_{RX}1$$

$$\theta_1 = \tan^{-1}(Q_{TX}I_{RX}1/I_{TX}I_{RX}1)$$

If the initial absolute value of $\theta_0$ is greater than the initial absolute value of $\theta_1$:

cos $\theta_0$/cos(90°+$\theta_0$+ε)=$I_{TX}I_{RX}$0/$Q_{TX}I_{RX}$0, then derive $\theta_0$ from this first (assume ε=0 initially).

cos $\theta_1$/cos(90°+$\theta_1$+ε)=$I_{TX}I_{RX}$1/$Q_{TX}I_{RX}$1, then derive $\theta_1$ from this cos($\theta_0$+ε−φ)/cos(90°+φ−$\theta_0$)=$Q_{TX}Q_{RX}$0/$I_{TX}Q_{RX}$0, then derive φ from this cos($\theta_1$+ε−φ)/cos(90°+φ−$\theta_1$)=$Q_{TX}Q_{RX}$1/$I_{TX}Q_{RX}$1, then derive ε from this Reiterate the first equation (cos $\theta_0$/cos(90°+$\theta_0$+ε)=$I_{TX}I_{RX}$0/$Q_{TX}I_{RX}$0, then derive $\theta_0$ from this first (assume ε=0 initially) until it is solved.

If the initial absolute value of $\theta_0$ is less than the initial absolute value of $\theta_1$:

cos $\theta_1$/cos(90°+$\theta_1$+ε)=$I_{TX}I_{RX}$1/$Q_{TX}I_{RX}$1, then derive $\theta_1$ from this first (assume ε=0 initially).

cos $\theta_0$/cos(90°+$\theta_0$+ε)=$I_{TX}I_{RX}$0/$Q_{TX}I_{RX}$0, then derive $\theta_0$ from this cos($\theta_0$+ε−φ)/cos(90°+φ−$\theta_0$)=$Q_{TX}Q_{RX}$0/$I_{TX}Q_{RX}$0, then derive φ from this cos($\theta_1$+ε−φ)/cos(90°+φ−$\theta_1$)=$Q_{TX}Q_{RX}$1/$I_{TX}Q_{RX}$1, then derive ε from this Reiterate the first equation (cos $\theta_0$/cos(90°+$\theta_0$+ε)=$I_{TX}I_{RX}$0/$Q_{TX}I_{RX}$0, then derive $\theta_0$ from this first (assume ε=0 initially) until it is solved.

Alternative Method for Estimation Algorithm by Iteration

Start with an initial estimation of $\theta_0 = a\tan(-Q_{TX}I_{RX0}/I_{TX}I_{RX0})$ Estimate the $A_0 = I_{TX}I_{RX0}/\cos(\theta_0)$ With $A_0$ and $\theta_0$, estimate the $\varepsilon = a\cos(Q_{TX}I_{RX0}/A_0) - \pi/2 - \theta_0$ With $\varepsilon$, estimate the $$\theta_1 = a\tan\left(-\frac{\frac{QTXIRX_1}{ITXIRX_1} + \sin(\varepsilon)}{\cos(\varepsilon)}\right)$$

With $\varepsilon$ and $\theta_1$, estimate the $$\varphi = \theta_1 - a\cot\frac{\frac{QTXQTX1}{ITXQRX1} + \sin(\varepsilon)}{\cos(\varepsilon)}$$

With $\theta_1$, estimate the $A_1 + I_{TX}I_{RX1}/\cos(\theta_1)$

Then, $\alpha = I_{TX}Q_{RX1}/(A_1 * \sin(\theta_1 - \varphi))$

New $\theta_0$ for the next iteration can be calculated by taking the average of the two values:

$$\theta_0 = a\sin(I_{TX}Q_{RX0}/\alpha * A_0) + \varphi$$

$$\theta_0 = a\cos(Q_{TX}Q_{RX0}/\alpha * A_0) + \varphi - \varepsilon$$

The iterations may be performed a number of times from a few to ten or more. Simulation is floating point based without approximation for trigonometric functions. Any DC offset can impact the accuracy.

After the variables for $\theta_0$, $A_0$, $\theta_1$ and $A_1$ are solved, then it is determined whether an optional additional fine phase adjustment is desired as an additional check. For example, a third tuning code, dCT+/-$\Delta 2$ (dig_cap_tuning code+/-1 or +/-2 or some fine tuning to introduce a $\Delta\theta$fine) can be applied to the fine phase shifter 330 and the above steps can be repeated to perform an additional analysis for a $\theta_2$ and $A_2$.

If the third fine phase adjustment is not performed, then I/Q mismatch correction factors $\varphi'$ (or $\varphi c$) and $\alpha'$ (or $\alpha c$) are generated by the I/Q amplitude/phase error estimation element 350. For example, the correction factor $\varphi'$ may be applied as a function $\tan(\varphi')$ over connection 356 to the mixer 358 and the correction factor $\alpha'$ may be applied as a function $1/\alpha'\cos(\varphi')$ over connection 357 to the mixer 359. The output of the multiplier 358 is provided over connection 361 to the signal combiner 362 and the output of the multiplier 359 is provided over connection 363 to the signal combiner 362. In an exemplary embodiment, the I/Q amplitude/phase error estimation element 350 takes the digital output of the ADCs 344 and 346, and computes solutions for the variables $\theta$, $\varepsilon$, $\alpha$, $\varphi$, and A. The I/Q amplitude/phase error estimation element 350 can be a CPU, a DSP or dedicated HW to perform such calculations, and it returns a correction code on connection 354 for those digital data on connections 347 and 348 to be applied by the multipliers 358 and 359, respectively.

Other numerical ways of solving the equations are possible with the above being an example.

Begin Frequency Dependent (FD) RSB Calibration Procedure.

After the frequency independent (FI) part of the RSB calibration process is completed, then a frequency dependent (FD) part of the RSB calibration process begins.

The baseband data input on connection 317 is switched to the RF calibration path through the coarse phase shifter 320. For example, the DAC 214*a* provides a BB (DC) signal over connection 317 (FIG. 3) to the mixer 318, which becomes an RF carrier signal once upconverted (or an IF signal is provided to the mixer 318).

The amplitude and relative DC phase of XI and XQ should follow the previously derived Tx-Rx phase difference $\theta n$ on the XI path and $\theta n + \pi/2$ on the XQ path.

Next, the terms for the IQ BB correction function h(t) 370 are derived. Since XI(t) approximates XQ,FD,comp(t)=XQ, FI,comp(t)*h(t), h(t) is determined so that XQ,FD,comp(t) approximates XI,comp(t)·tan($-\theta 0$), and XI(t) and XQ(t) are captured at the ADC (344/346) output, the function h(t) can be estimated using adaptive filter estimation algorithm. This operation may be referred to as a frequency dependent (FD) part of the RSB calibration.

Figure 4:
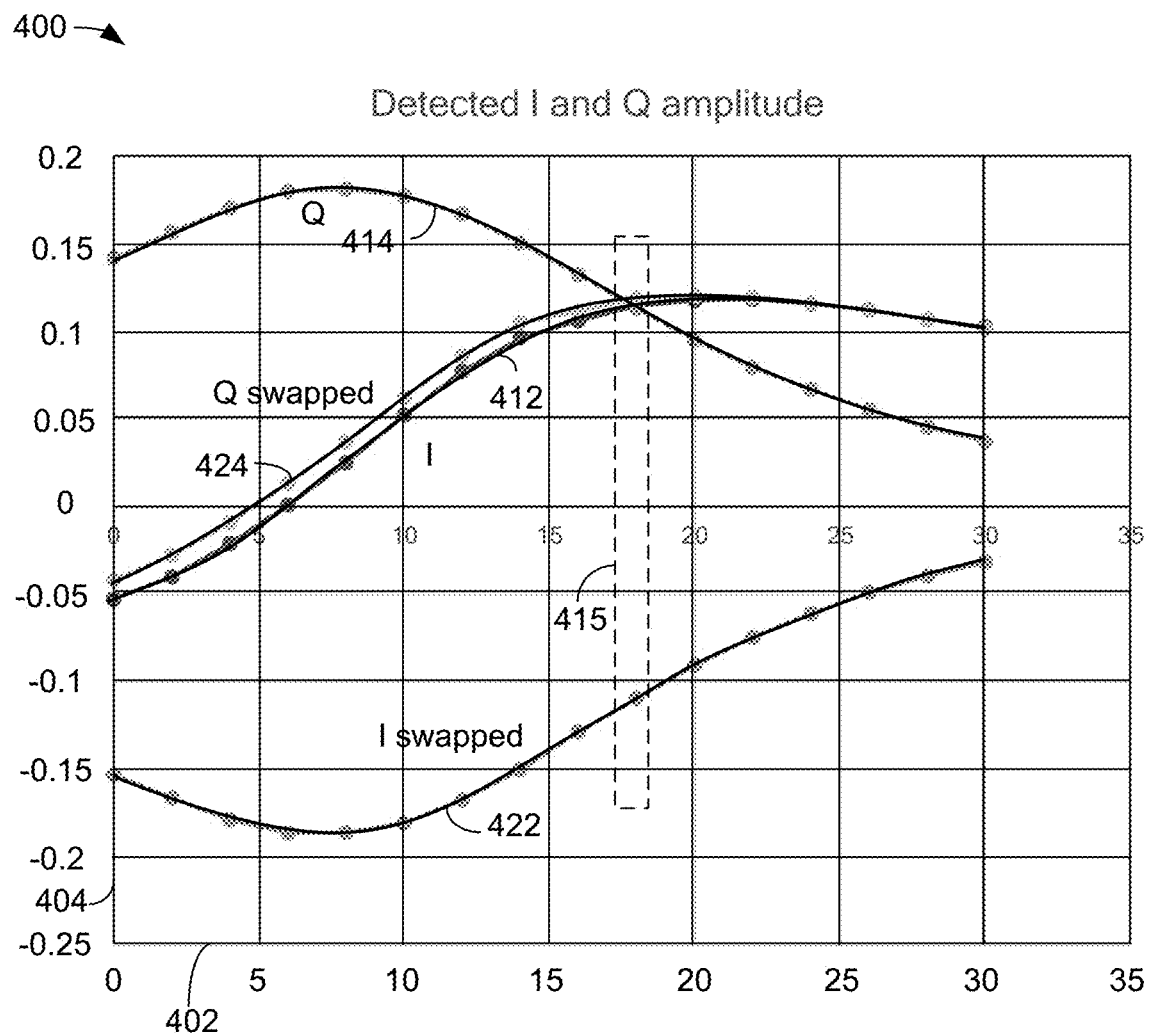
FIG. 4 is a graph showing detected I and Q amplitude (A) over digital capacitor tuning code.

FIG. 4 is a graph 400 showing detected I and Q amplitude (A) over digital capacitor tuning code. The vertical axis 402 represents amplitude (the variable A) in millivolts (mV) and the horizontal axis 404 represents the digital tuning code (dCT) used to adjust the coarse phase shifter 320 (FIG. 3).

In an exemplary embodiment, as the control code applied to the coarse phase shifter 320 (FIG. 3) is swept over a range, the amplitude of the Rx in phase and Rx quadrature signals received at the in phase baseband filter (BBF I(t)) 337 and the quadrature baseband filter (BBF Q(t)) 338, respectively, changes with the changing control code. In an exemplary embodiment, the trace 412 shows the detected I amplitude, the trace 414 shows the detected Q amplitude, the trace 422 shows the detected I swapped amplitude (when CAL_LO_I and CAL_LO_Q are swapped, and the trace 424 shows the detected Q swapped amplitude. The region in the dotted box 415 generally shows the highest amplitude for both the in phase signal and the quadrature signal, and represents a point at which the in phase signal and the quadrature signal are separated in phase by as close to 45° as possible.

Figure 5:
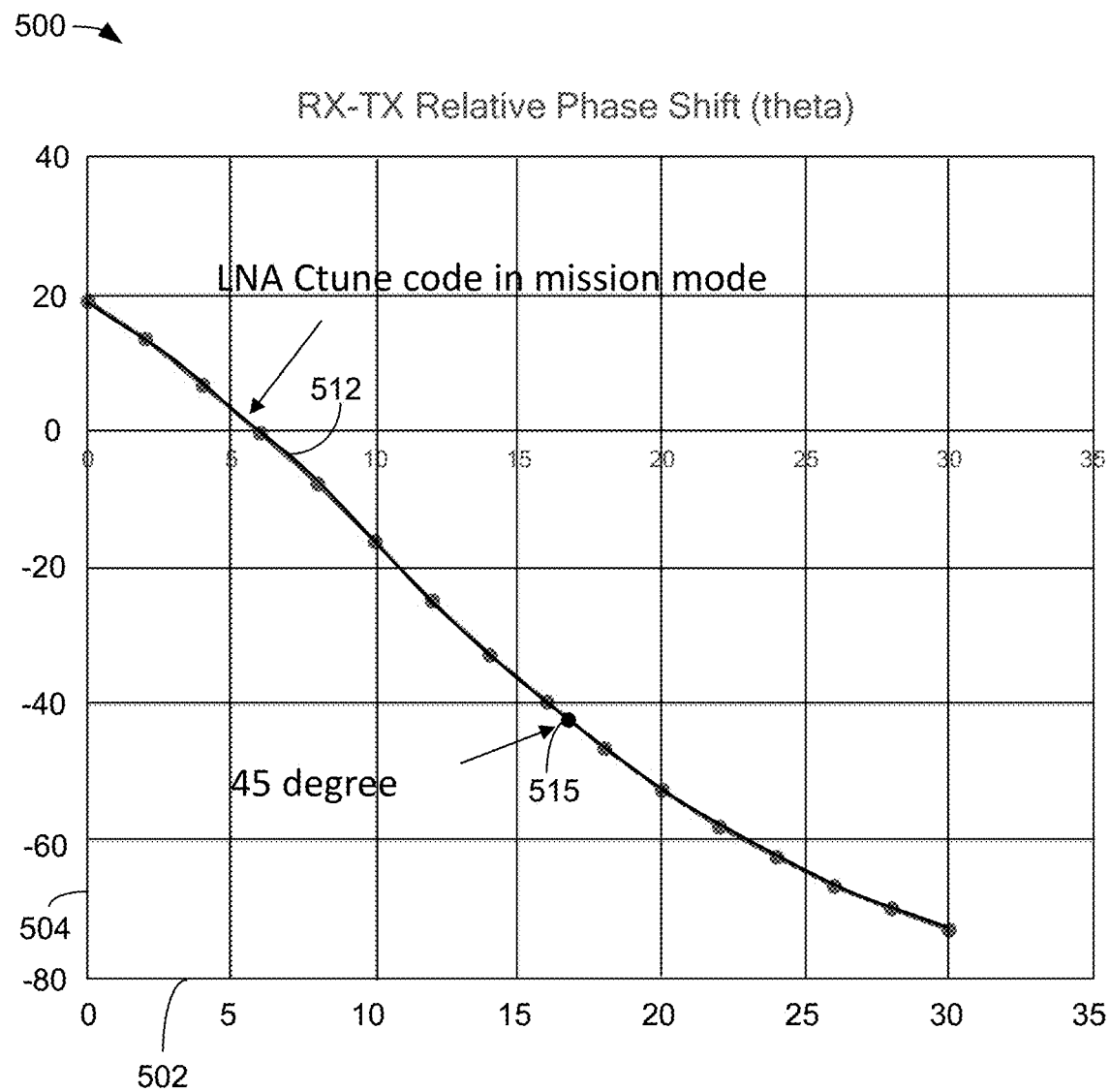
FIG. 5 is a graph showing relative Rx-Tx phase shift (θ) over digital capacitor tuning code.

FIG. 5 is a graph 500 showing relative Rx-Tx phase shift ($\theta$) over digital capacitor tuning code. The vertical axis 502 represents the relative phase difference between Tx and Rx ($\theta$) in degrees and the horizontal axis 504 represents the digital tuning code (dCT) used to adjust the coarse phase shifter 320 (FIG. 3). The trace 512 represents tuning code of the adjustable capacitance 332 in the fine phase shifter 330 (FIG. 3) and the point 515 represents the control code that provides a 45° phase shift between the RX BB I(t) signal on connection 341 and the RX BB Q(t) signal on connection 342 (FIG. 3).

Figure 6A:
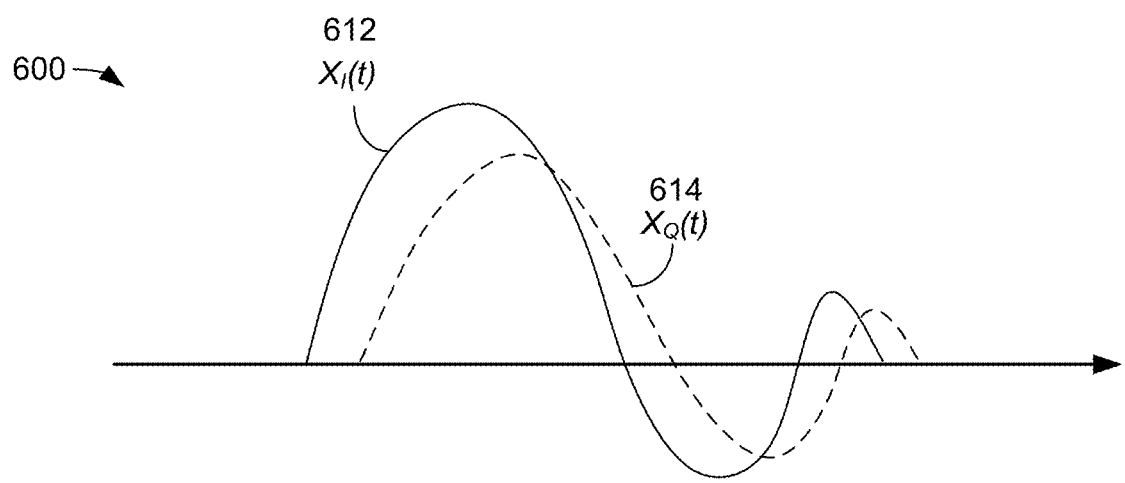
FIG. 6A and FIG. 6B collectively are a graphical illustration of the operation of the correction function h(t) of FIG. 3B.
Figure 6B:
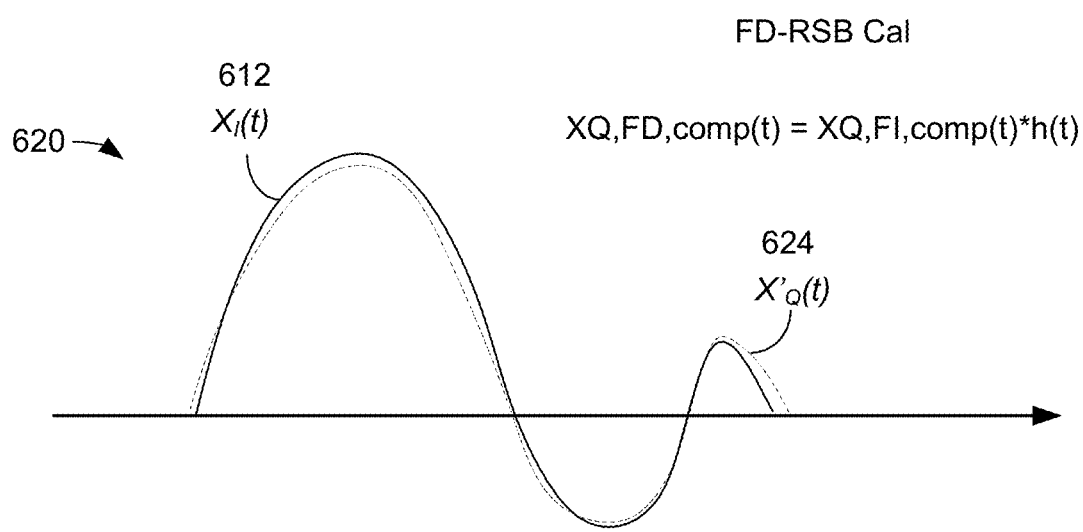

FIG. 6A and FIG. 6B collectively are a graphical illustration of the operation of the correction function h(t) of FIG. 3. In FIG. 6A, the graph 600 shows a trace 612 representing the in phase signal $X_I(t)$ (the output of the in phase baseband filter (BBF I(t)) 337 and a trace 614 representing the quadrature signal $X_Q(t)$ (the output of the quadrature baseband filter (BBF Q(t)) 338).

In FIG. 6B the graph 620 shows the trace 612 representing the in phase signal $X_I(t)$ (the output of the in phase baseband filter (BBF I(t)) 337 and a trace 624 representing the corrected quadrature signal XQ,FD,comp(t)=XQ,FI, comp(t)*h(t) (the output of the quadrature baseband filter (BBF Q(t)) 338, after frequency dependent RSB calibration (i.e., the operation of the correction function h(t) 370.

Figure 7A:
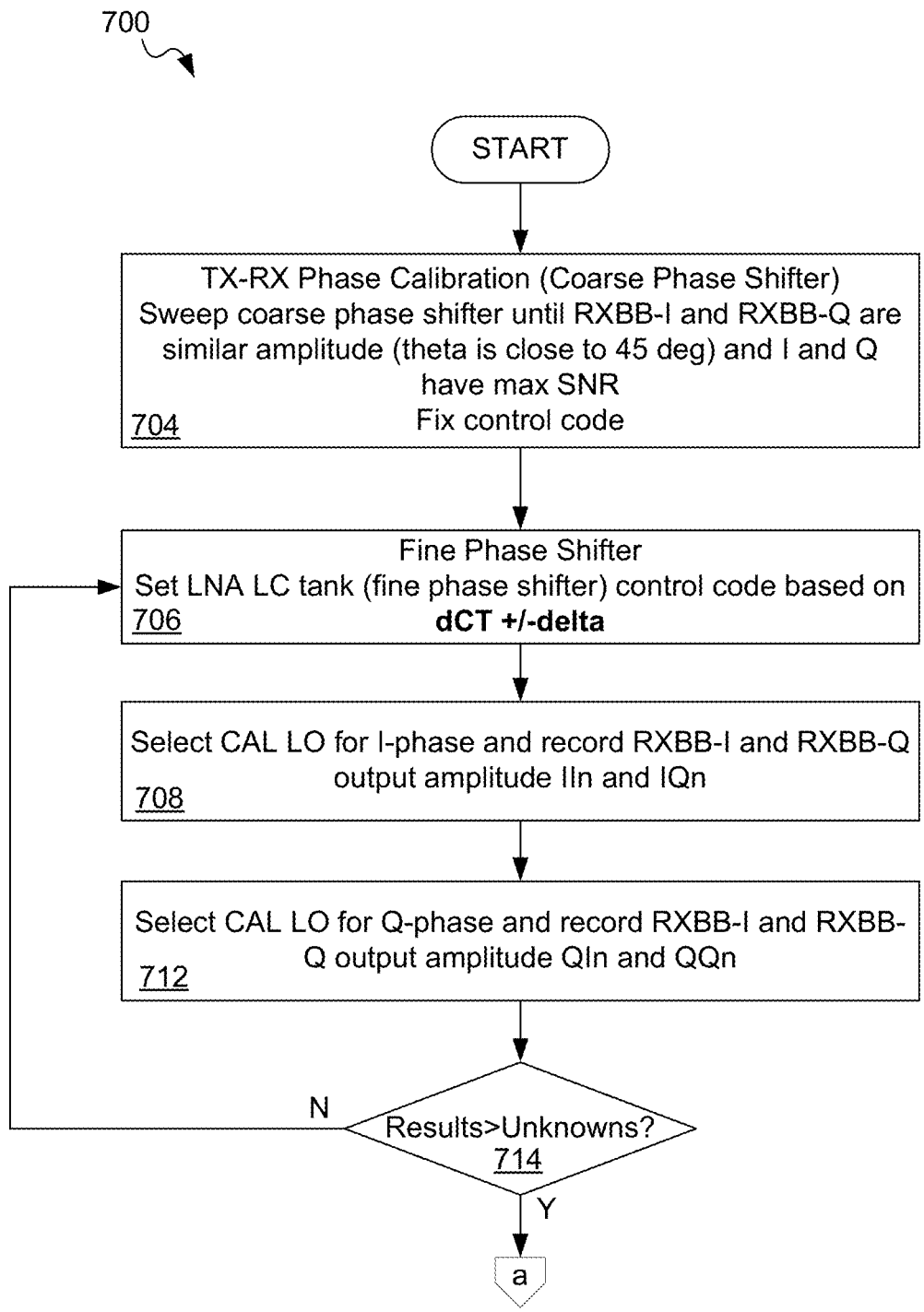
FIG. 7A and FIG. 7B collectively show a flow chart describing an example of the operation of a method for residual sideband (RSB) calibration in an ultra-wideband (UWB) transmitter.
Figure 7B:
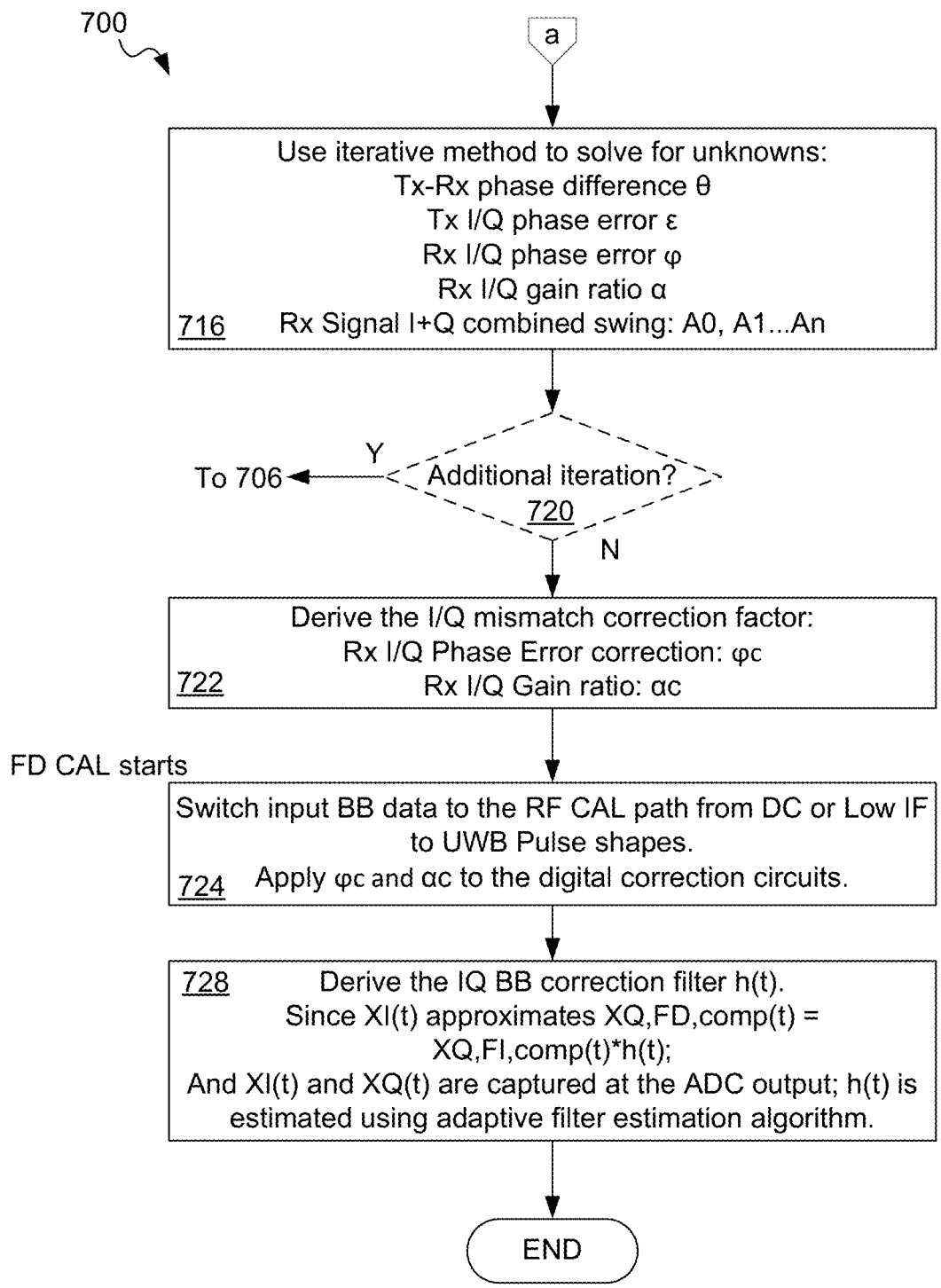

FIG. 7A and FIG. 7B collectively show a flow chart describing an example of the operation of a method for residual sideband (RSB) calibration in an ultra-wideband (UWB) transmitter. The blocks in the method 700 can be performed in or out of the order shown, and in some embodiments, can be performed at least in part in parallel.

In block 704, TX-RX phase calibration begins by sweeping the control code applied to the coarse phase shifter 320 to create as close to a 45° phase difference (θ) between the CAL_LO_I signal and CAL_LO_Q signal to maximize the signal swing (amplitude of the voltage swing) of the CAL_LO_I signal and CAL_LO_Q signal. In an exemplary embodiment, the control code provided by the data processor 210 (FIG. 2A or 2B or another controller) to the coarse phase shifter 320 is swept until RXBB-I (at the in phase baseband filter (BBF I(t)) 337) and RXBB_Q (at the quadrature baseband filter (BBF Q(t)) 338) have a similar amplitude, implying that θ (the relative Tx-Rx LO phase difference) is close to 45° and both I and Q have maximum signal-to-noise ratio (SNR).

In block 706, the control code provided by the data processor 210 (FIG. 2A or 2B, or another controller) to the fine phase shifter 330 sets the fine phase shifter 330 based on dCT+/−Δ, as described above.

In block 708, the LO input to the mux 311 (FIG. 3B) is set to select the CAL_LO_I signal on connection 308 is selected and the BB BPSK transmit signal upconverted by the CAL_LO_I signal is provided to the signal combiner 306. The in phase baseband filter (BBF I(t)) 337 output on connection 341 is measured and the quadrature baseband filter (BBF I(t)) 338 output on connection 342 is measured to obtain output amplitudes $I_{TX}I_{RX}$=A cos(θ) and $I_{TX}Q_{RX}$=αA cos(θ−φ+90°), respectively.

In block 712, the LO input to the mux 311 (FIG. 3B) is swapped to select the CAL_LO_Q signal on connection 309 is selected and the BB BPSK transmit signal upconverted by the CAL_LO_Q signal is provided to the signal combiner 306. The in phase baseband filter (BBF I(t)) 337 output on connection 341 is measured and the quadrature baseband filter (BBF I(t)) 338 output on connection 342 is measured to obtain output amplitudes $Q_{TX}I_{RX}$=A cos(θ+ε−90°) and $Q_{TX}Q_{RX}$=αA cos(θ+ε−φ), respectively.

In this manner the following four equations are generated:

$$I_{TX}I_{RX} = A\cos(\theta)$$
$$I_{TX}Q_{RX} = \alpha A\cos(\theta - \varphi + 90°).$$
$$Q_{TX}I_{RX} = A\cos(\theta + \varepsilon - 90°)$$
$$Q_{TX}Q_{RX} = \alpha A\cos(\theta + \varepsilon - \varphi)$$

In block 714 it is determined whether there are more result equations than unknowns. If there are more unknowns than result equations, then the process returns to block 706 where the fine phase shifter 330 is adjusted based on dCT+/−Δ (i.e., the adjustable component(s) in the fine phase shifter 330 are set to a different value to select a different phase) and the above steps are repeated to generate additional result equations generated after adjusting the fine phase shifter 330 to a different phase. For example, the data processor 210 (FIG. 2B or another controller may determine whether there are more result equations than unknowns. If in block 714 it is determined that there are more result equations than unknowns, the process proceeds to block 716.

In block 716, the iterative method described above is used to solve for the unknowns $\theta_0$, $\theta_1$ ε, φ, α, $A_0$, $A_1$, as described above. For example, the data processor 210 (FIG. 2B or another controller to solve for the unknowns $\theta_0$, $\theta_1$ ε, φ, α, $A_0$, $A_1$, as described above.

In block 720 it is determined whether additional iterations of adjusting the fine phase shifter 330 are desired. If it is determined that additional iterations are desired, then the process returns to block 706. If it is determined that additional iterations are ot desired, then the process proceeds to block 722.

In block 722, the I/Q mismatch correction factors (Rx I/Q phase error correction factor φ' and Rx I/Q gain ratio correction factor α' on connection 354) are derived by the I/Q amplitude/phase error estimation element 350.

In block 724, frequency dependent calibration begins. For example, the baseband data input on connection 317 is switched to the RF calibration path through the coarse phase shifter 320. For example, the DAC 214a provides a BB (DC) signal over connection 317 (FIG. 3) to the mixer 318, which becomes an RF carrier signal once upconverted (or an IF signal is provided to the mixer 318). The Rx I/Q phase error correction factor φ' and Rx I/Q gain ratio correction factor α' on connection 354 are applied to the multiplier 358 and to the multiplier 359. The amplitude and relative DC phase of XI and XQ follow the previously derived Tx-Rx phase difference θn on the XI path and θn+π/2 on the XQ path.

In block 728, the terms for the IQ BB correction function h(t) 370 are derived. Since XI(t) approximates XQ,FD,comp (t)=XQ,FI,comp(t)*h(t), h(t) is determined so that XQ,FD,comp(t) approximates XI,comp(t)·tan(−θ0), and XI(t) and XQ(t) are captured at the ADC (344/346) output, the function h(t) can be estimated by the I/Q amplitude/phase error estimation element 350 using an adaptive filter estimation algorithm as described above.

Figure 8A:
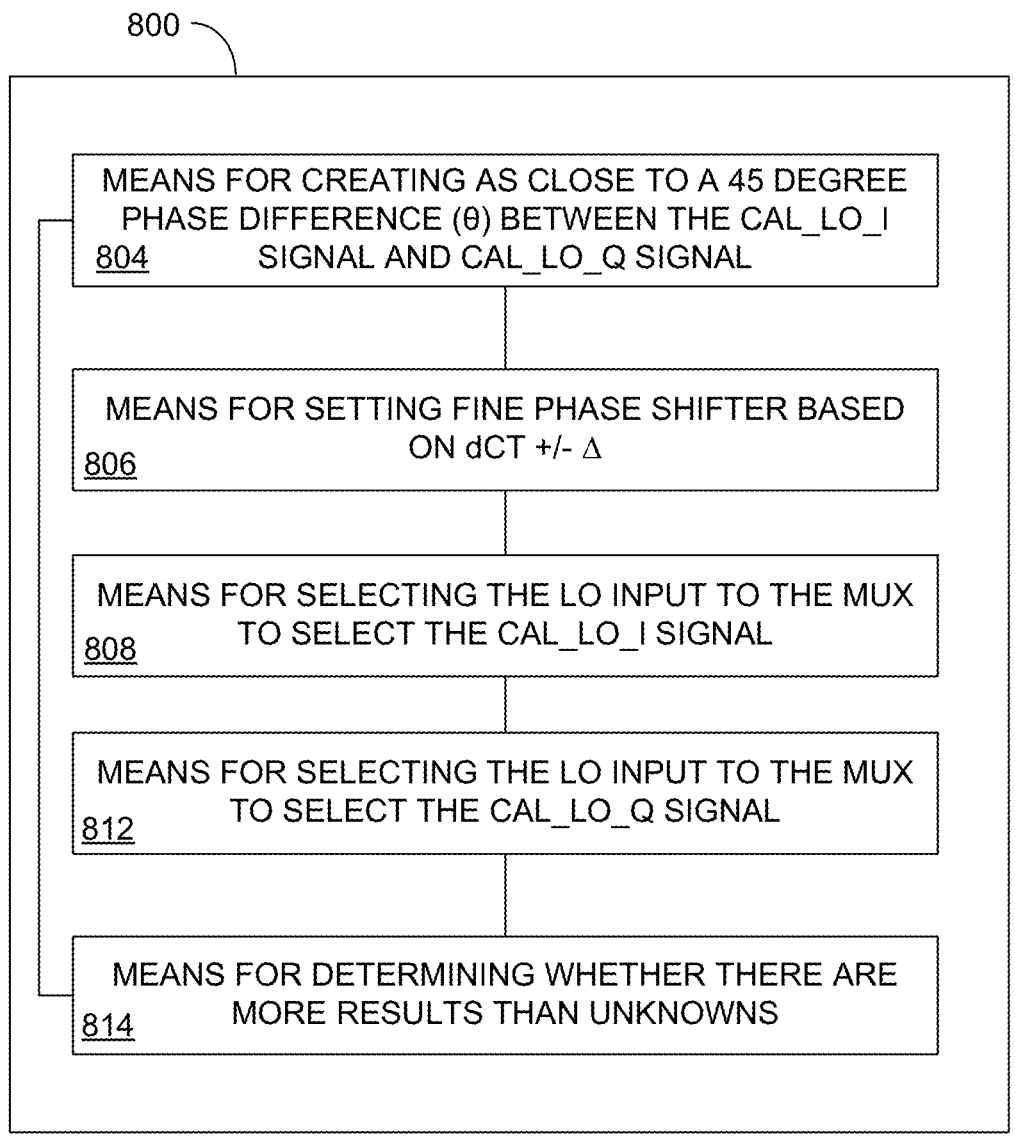
FIG. 8A and FIG. 8B collectively show an apparatus for residual sideband (RSB) calibration in an ultra-wideband (UWB) transmitter.
Figure 8B:
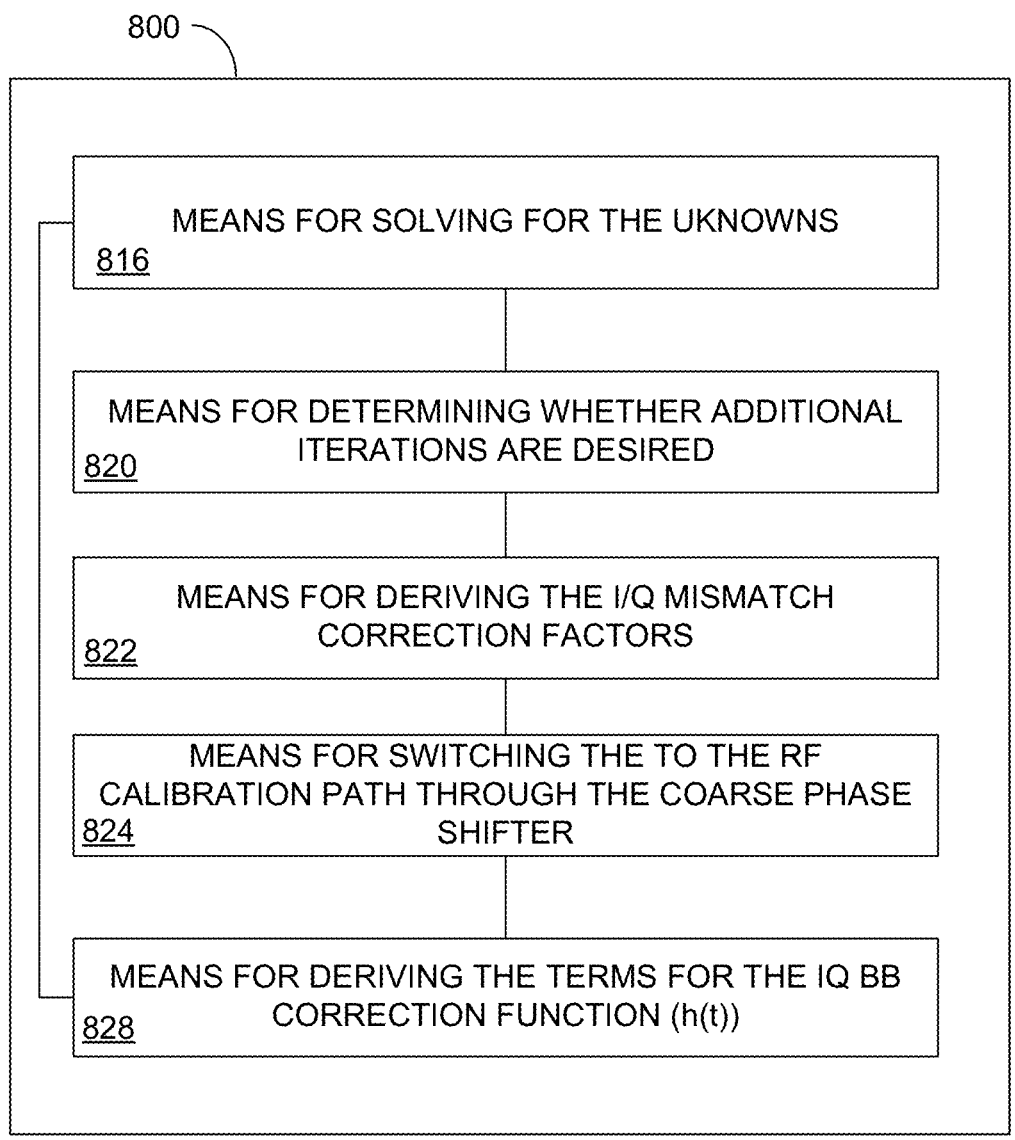

FIG. 8A and FIG. 8B collectively show an apparatus for residual sideband (RSB) calibration in an ultra-wideband (UWB) transmitter. The apparatus 800 comprises means 804 for creating as close to a 45° phase difference (θ) between the CAL_LO_I signal and CAL_LO_Q signal. In certain embodiments, the means 804 for creating as close to a 45° phase difference (θ) between the CAL_LO_I signal and CAL_LO_Q signal can be configured to perform one or more of the functions described in operation block 704 of method 700 (FIG. 7A). In an exemplary embodiment, the means 804 for creating as close to a 45° phase difference (θ) between the CAL_LO_I signal and CAL_LO_Q signal may comprise sweeping the control code applied to the coarse phase shifter 320 to create as close to a 45° phase difference (θ) between the CAL_LO_I signal and CAL_LO_Q signal to maximize the signal swing (amplitude of the voltage swing) of the CAL_LO_I signal and CAL_LO_Q signal.

The apparatus may also comprise means 806 for setting the fine phase shifter based on dCT+/−Δ. In certain embodiments, the means 806 for setting the fine phase shifter based on dCT+/−Δ can be configured to perform one or more of the functions described in operation block 704 of method 700 (FIG. 7A). In an exemplary embodiment, the means 806 for setting the fine phase shifter based on dCT+/−Δ may comprise applying the control code provided by the data processor 210 (FIG. 2A or 2B, or another controller) to the fine phase shifter 330 to set the fine phase shifter 330 based on dCT+/−Δ.

The apparatus may also comprise means 808 for selecting the LO input to the mux to select the CAL_LO_I signal. In certain embodiments, the means 808 for selecting the LO input to the mux to select the CAL_LO_I signal can be configured to perform one or more of the functions described in operation block 708 of method 700 (FIG. 7A). In an exemplary embodiment, the means 808 for selecting the LO input to the mux to select the CAL_LO_I signal may comprise selecting the LO input to the mux 311 (FIG. 3B)

to select the CAL_LO_I signal and measuring the in phase baseband filter (BBF I(t)) 337 output and the quadrature baseband filter (BBF I(t)) 338 output.

The apparatus may also comprise means 812 for selecting the LO input to the mux to select the CAL_LO_Q signal. In certain embodiments, the means 812 for selecting the LO input to the mux to select the CAL_LO_Q signal can be configured to perform one or more of the functions described in operation block 712 of method 700 (FIG. 7A). In an exemplary embodiment, the means 812 for selecting the LO input to the mux to select the CAL_LO_Q signal may comprise selecting the LO input to the mux 311 (FIG. 3B) to select the CAL_LO_Q signal and measuring the in phase baseband filter (BBF I(t)) 337 output and the quadrature baseband filter (BBF I(t)) 338 output.

The apparatus may also comprise means 814 for determining whether there are more result equations than unknowns. In certain embodiments, the means 814 for determining whether there are more result equations than unknowns can be configured to perform one or more of the functions described in operation block 714 of method 700 (FIG. 7A). In an exemplary embodiment, the means 814 for determining whether there are more result equations than unknowns may comprise the data processor 210 (FIG. 2B or another controller determining whether there are more result equations than unknowns.

The apparatus may also comprise means 816 for solving for the unknowns. In certain embodiments, the means 816 for solving for the unknowns can be configured to perform one or more of the functions described in operation block 716 of method 700 (FIG. 7A). In an exemplary embodiment, the means 816 for solving for the unknowns may comprise the data processor 210 (FIG. 2B or another controller solving for the unknowns $\theta_0$, $\theta_1$ $\varepsilon$, $\varphi$, $\alpha$, $A_0$, $A_1$, as described above.

The apparatus may also comprise means 820 for determining whether additional iterations are desired. In certain embodiments, the means 820 for determining whether additional iterations are desired can be configured to perform one or more of the functions described in operation block 720 of method 700 (FIG. 7A). In an exemplary embodiment, the means 820 for determining whether additional iterations are desired may comprise the data processor 210 (FIG. 2B or another controller determining whether additional iterations are desired.

The apparatus may also comprise means 822 for deriving the I/Q mismatch correction factors. In certain embodiments, the means 822 for deriving the I/Q mismatch correction factors can be configured to perform one or more of the functions described in operation block 722 of method 700 (FIG. 7A). In an exemplary embodiment, the means 822 for deriving the I/Q mismatch correction factors may comprise the I/Q amplitude/phase error estimation element 350 deriving the Rx I/Q phase error correction factor $\varphi'$ and Rx I/Q gain ratio correction factor $\alpha'$.

The apparatus may also comprise means 824 for switching to the RF calibration path through the coarse phase shifter. In certain embodiments, the means 824 for switching to the RF calibration path through the coarse phase shifter can be configured to perform one or more of the functions described in operation block 724 of method 700 (FIG. 7A). In an exemplary embodiment, the means 824 for switching to the RF calibration path through the coarse phase shifter may comprise switching the baseband data input on connection 317 to the RF calibration path through the coarse phase shifter 320. The amplitude and relative DC phase of XI and XQ follow the previously derived Tx-Rx phase difference $\theta n$ on the XI path and $\theta n+\pi/2$ on the XQ path.

The apparatus may also comprise means 828 for deriving the terms for the IQ BB correction function h(t). In certain embodiments, the means 828 for deriving the terms for the IQ BB correction function h(t) can be configured to perform one or more of the functions described in operation block 728 of method 700 (FIG. 7A). In an exemplary embodiment, the means 828 for deriving the terms for the IQ BB correction function h(t) may comprise the I/Q amplitude/phase error estimation element 350 estimating the filter function of the correction function h(t) 370 using an adaptive filter estimation algorithm.

Implementation examples are described in the following numbered clauses:

1. A radio frequency (RF) residual sideband (RSB) calibration circuit, comprising: a complex (in phase/quadrature (I/Q)) signal receiver; a signal generator configured to generate a transmit (Tx) signal; a first phase shifter connected to the signal generator, the first phase shifter configured to selectively process one of an in phase local oscillator (LO) signal and a quadrature LO signal to create an initial phase between receive in phase (I) and quadrature (Q) signals to create balanced I/Q signals; a first signal combiner configured to combine a receive (Rx) signal with the transmit (Tx) signal to generate a first combined signal; a second phase shifter configured to provide a selected phase shift to the first combined signal; a complex downconverter configured to generate an in phase Rx signal and a quadrature Rx signal; an I/Q amplitude/phase error estimation element configured to determine amplitude and phase error of the in phase Rx signal and quadrature Rx signal, and configured to generate a phase compensation signal ($\varphi'$) and an amplitude compensation signal ($\alpha'$); a first multiplier configured to generate a compensated in phase Rx signal and a second multiplier configured to generate a compensated quadrature Rx signal; a second signal combiner configured to combine the compensated in phase Rx signal and the compensated quadrature Rx signal to generate a frequency independent compensated signal; and a filter (h(t)) configured to generate a frequency dependent compensated signal.

2. The RF RSB calibration circuit of clause 1, wherein the second phase shifter comprises an inductive (L) capacitive (C) circuit including an adjustable capacitance and an inductance.

3. The RF RSB calibration circuit of any of clauses 1 through 2, wherein one of the in phase LO signal and the quadrature LO signal are mixed with a baseband (BB) information signal.

4. The RF RSB calibration circuit of any of clauses 1 through 3, wherein the first phase shifter is a coarse phase shifter.

5. The RF RSB calibration circuit of clause 4, wherein the phase shifts generated by the second phase shifter are smaller compared to the phase shifts provided by the first phase shifter.

6. The RF RSB calibration circuit of any of clauses 1 through 5, wherein the signal generator comprises an ultra-wideband (UWB) transmitter configured to provide a real (bi-phase) transmit signal.

7. The RF RSB calibration circuit of any of clauses 1 through 6, wherein the filter (h(t)) implements a function configured to adapt the frequency dependent compensated signal to at least one of the compensated in phase Rx signal and the compensated quadrature Rx signal.

8. The RF RSB calibration circuit of clause 4, wherein the coarse phase shifter is configured to adjust a relative phase between a transit signal and a receive signal to obtain an optimized phase setting when both the in phase Rx signal and the quadrature Rx signal are at a similar amplitude indicating that the relative phase between the transmit signal and the receive signal is approximately 45 degrees.

9. The RF RSB calibration circuit of clause 6, wherein the bi-phase transmit signal is alternatively combined with the in phase local oscillator (LO) signal and the quadrature LO signal.

10. A method for radio frequency (RF) residual sideband (RSB) calibration, comprising: enabling a residual sideband (RSB) signal generation circuit; adjusting a first phase shifter in a signal generation circuit so that a receive (Rx) baseband (BB) in phase signal and a Rx BB quadrature signal have a similar amplitude; setting a second phase shifter to an initial code (dCT+/−Δ); selecting a first (in phase) local oscillator (LO) calibration signal (CAL_LO_I) at the RSB signal generation circuit; responsive to the in phase LO calibration signal (CAL_LO_I), measuring an Rx BB-I output of an in phase baseband filter (BBF I(t)) ($I_{TX}I_{RX}$=A cos(θ)) and an Rx BB-Q output of a quadrature baseband filter (BBF Q(t)) ($I_{TX}Q_{RX}$=αA cos(θ−φ+90°)); selecting a second (quadrature) local oscillator (LO) calibration signal (CAL_LO_Q) at the RSB signal generation circuit; responsive to the quadrature LO calibration signal (CAL_LO_Q), measuring the Rx BB-I signal output of the in phase baseband filter (BBF I(t)) ($Q_{TX}I_{RX}$=A cos(θ+ε−90°)) and the Rx BB-Q signal output of the quadrature baseband filter (BBF Q(t)) ($Q_{TX}Q_{RX}$=αA cos(θ+ε−φ)); deriving an Rx I/Q phase error correction factor φc; deriving an Rx I/Q gain ratio αc; applying the Rx I/Q phase error correction factor φc and the Rx I/Q gain ratio αc to the Rx BB-I signal and to the Rx BB-Q signal to obtain a frequency independent compensation signal for input to a correction function (h(t)); adjusting the second phase shifter to obtain an additional set of outputs from the in phase baseband filter (BBF I(t)) and the quadrature baseband filter (BBF Q(t)); and combining an adjusted output of the in phase baseband filter (BBF I(t)) after the second phase shifter is adjusted to obtain an additional set of outputs from the in phase baseband filter (BBF I(t)) and the quadrature baseband filter (BBF Q(t)) with an output of the correction function (h(t)) to generate a frequency dependent compensated signal.

11. The method of clause 10, wherein deriving the Rx I/Q phase error correction factor φc and deriving the Rx I/Q gain ratio αc includes iteratively solving for the unknowns $θ_0$, $θ_1$ ε, φ, α, $A_0$, $A_1$.

12. The method of any of clauses 10 through 11, further comprising alternatively mixing the in phase LO signal and the quadrature LO signal with a baseband (BB) information signal.

13. The method of any of clauses 10 through 12, wherein the signal generation circuit provides a real (bi-phase) transmit signal.

14. The method of any of clauses 10 through 13, wherein the correction function (h(t)) adapts the frequency dependent compensation signal to at least one of the compensated in phase Rx signal and the compensated quadrature Rx signal.

15. A device for performing radio frequency (RF) residual sideband (RSB) calibration, comprising: means for enabling a residual sideband (RSB) signal generation circuit; means for adjusting a first phase shifter in a signal generation circuit so that a receive (Rx) baseband (BB) in phase signal and a Rx BB quadrature signal have a similar amplitude; means for setting a second phase shifter to an initial code (dCT+/−Δ); means for selecting a first (in phase) local oscillator (LO) calibration signal (CAL_LO_I) at the RSB signal generation circuit; means responsive to the in phase LO calibration signal (CAL_LO_I) for measuring an Rx BB-I output of an in phase baseband filter (BBF I(t)) ($I_{TX}I_{RX}$=A cos(θ)) and an Rx BB-Q output of a quadrature baseband filter (BBF Q(t)) ($I_{TX}Q_{RX}$=αA cos(θ−φ+90°)); means for selecting a second (quadrature) local oscillator (LO) calibration signal (CAL_LO_Q) at the RSB signal generation circuit; means responsive to the quadrature LO calibration signal (CAL_LO_Q) for measuring the Rx BB-I output of the in phase baseband filter (BBF I(t)) ($Q_{TX}I_{RX}$=A cos(θ+ε−90°)) and the Rx BB-Q output of the quadrature baseband filter (BBF Q(t)) ($Q_{TX}Q_{RX}$=αA cos(θ+ε−φ)); means for deriving an Rx I/Q phase error correction factor φc; means for deriving an Rx I/Q gain ratio αc; means for applying the Rx I/Q phase error correction factor φc and the Rx I/Q gain ratio αc to the Rx BB-I signal and to the Rx BB_Q signal to obtain a frequency independent compensation signal for input to a correction function (h(t)); means for adjusting the second phase shifter to obtain an additional set of outputs from the in phase baseband filter (BBF I(t)) and the quadrature baseband filter (BBF Q(t)); and means for combining an adjusted output of the in phase baseband filter (BBF I(t)) after the second phase shifter is adjusted to obtain an additional set of outputs from the in phase baseband filter (BBF I(t)) and the quadrature baseband filter (BBF Q(t)) with an output of the correction function (h(t)) to generate a frequency dependent compensated signal.

16. The device of clause 15, wherein the means for deriving the Rx I/Q phase error correction factor φc and deriving the Rx I/Q gain ratio αc includes means for iteratively solving for the unknowns $θ_0$, $θ_1$ ε, φ, α, $A_0$, $A_1$.

17. The device of any of clauses 15 through 16, further comprising means for alternatively mixing the in phase LO signal and the quadrature LO signal with a baseband (BB) information signal.

18. The device of any of clauses 15 through 17, wherein the signal generation circuit provides a real (bi-phase) transmit signal.

19. The device any of clauses 15 through 18, wherein the correction function (h(t)) comprises means for adapting the frequency dependent compensation signal to at least one of the compensated in phase Rx signal and the compensated quadrature Rx signal.

20. A system for radio frequency (RF) residual sideband (RSB) calibration, comprising: a complex (in phase/quadrature (I/Q)) signal receiver; a signal generator configured to generate a transmit (Tx) signal; a first phase shifter operably coupled to the signal generator, the first phase shifter configured to selectively process one of an in phase local oscillator (LO) signal and a quadrature LO signal to create an initial phase between receive in phase (I) and quadrature (Q) signals to create balanced I/Q signals; a first signal combiner configured to combine a receive (Rx) signal with the transmit (Tx) signal to generate a first combined signal; a second phase shifter configured to provide a selected phase shift to the first combined signal; and a complex downconverter configured to generate an in phase Rx signal and a quadrature Rx signal alternatively using the in phase LO signal and the quadrature LO signal to generate one or more signals indicative of relative Tx-Rx LO phase (θ), amplitude (A), Tx LO I/Q phase mismatch (ε), Rx I/Q amplitude mismatch (α), and Rx I/Q phase mismatch (φ) at the output of the complex receiver.

21. The system of clause 20, wherein the second phase shifter comprises an inductive (L) capacitive (C) circuit including an adjustable capacitance and an inductance.

22. The system of any of clauses 20 through 21, wherein the in phase LO signal and the quadrature LO signal are alternatively combined with a baseband (BB) information signal.

23. The system of any of clauses 20 through 22, wherein the signal generator comprises an ultra-wideband (UWB) transmitter configured to provide a real (bi-phase) transmit signal.

24. The system of any of clauses 20 through 23 wherein the first phase shifter is a coarse phase shifter.

25. The system of clause 24, wherein the phase shifts generated by the second phase shifter are smaller compared to the phase shifts provided by the first phase shifter.

The circuit architecture described herein described herein may be implemented on one or more ICs, analog ICs, RFICs, mixed-signal ICs, ASICs, printed circuit boards (PCBs), electronic devices, etc. The circuit architecture described herein may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the circuit described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

Although selected aspects have been illustrated and described in detail, it will be understood that various substitutions and alterations may be made therein without departing from the spirit and scope of the present invention, as defined by the following claims.

What is claimed is:

1. A radio frequency (RF) residual sideband (RSB) calibration circuit, comprising:
    a complex (in phase/quadrature (I/Q)) signal receiver;
    a signal generator configured to generate a transmit (Tx) signal;
    a first phase shifter connected to the signal generator, the first phase shifter configured to selectively process one of an in phase local oscillator (LO) signal and a quadrature LO signal to create an initial phase between receive in phase (I) and quadrature (Q) signals to create balanced I/Q signals;
    a first signal combiner configured to combine a receive (Rx) signal with the transmit (Tx) signal to generate a first combined signal;
    a second phase shifter configured to provide a selected phase shift to the first combined signal;
    a complex downconverter configured to generate an in phase Rx signal and a quadrature Rx signal;
    an I/Q amplitude/phase error estimation element configured to determine amplitude and phase error of the in phase Rx signal and quadrature Rx signal, and configured to generate a phase compensation signal ($\varphi'$) and an amplitude compensation signal ($\alpha'$);
    a first multiplier configured to generate a compensated in phase Rx signal and a second multiplier configured to generate a compensated quadrature Rx signal;
    a second signal combiner configured to combine the compensated in phase Rx signal and the compensated quadrature Rx signal to generate a frequency independent compensated signal; and
    a filter (h(t)) configured to generate a frequency dependent compensated signal.

2. The RF RSB calibration circuit of claim 1, wherein the second phase shifter comprises an inductive (L) capacitive (C) circuit including an adjustable capacitance and an inductance.

3. The RF RSB calibration circuit of claim 1, wherein one of the in phase LO signal and the quadrature LO signal are mixed with a baseband (BB) information signal.

4. The RF RSB calibration circuit of claim 1, wherein the first phase shifter is a coarse phase shifter.

5. The RF RSB calibration circuit of claim 4, wherein the phase shifts generated by the second phase shifter are smaller compared to the phase shifts provided by the first phase shifter.

6. The RF RSB calibration circuit of claim 1, wherein the signal generator comprises an ultra-wideband (UWB) transmitter configured to provide a real (bi-phase) transmit signal.

7. The RF RSB calibration circuit of claim 1, wherein the filter (h(t)) implements a function configured to adapt the frequency dependent compensated signal to at least one of the compensated in phase Rx signal and the compensated quadrature Rx signal.

8. The RF RSB calibration circuit of claim 4, wherein the coarse phase shifter is configured to adjust a relative phase between a transit signal and a receive signal to obtain an optimized phase setting when both the in phase Rx signal and the quadrature Rx signal are at a similar amplitude indicating that the relative phase between the transmit signal and the receive signal is approximately 45 degrees.

9. The RF RSB calibration circuit of claim 6, wherein the bi-phase transmit signal is alternatively combined with the in phase local oscillator (LO) signal and the quadrature LO signal.

10. A method for radio frequency (RF) residual sideband (RSB) calibration, comprising:
    enabling a residual sideband (RSB) signal generation circuit;
    adjusting a first phase shifter in a signal generation circuit so that a receive (Rx) baseband (BB) in phase signal and a Rx BB quadrature signal have a similar amplitude;
    setting a second phase shifter to an initial code (dCT+/−Δ);
    selecting a first (in phase) local oscillator (LO) calibration signal (CAL_LO_I) at the RSB signal generation circuit;
    responsive to the in phase LO calibration signal (CAL_LO_I), measuring an Rx BB-I output of an in phase baseband filter (BBF I(t))($I_{TX}I_{RX}$=Acos($\theta$)) and an Rx BB-Q output of a quadrature baseband filter (BBF Q(t))($I_{TX}Q_{RX}$=αAcos($\theta$−$\varphi$+90°));
    selecting a second (quadrature) local oscillator (LO) calibration signal (CAL_LO_Q) at the RSB signal generation circuit;
    responsive to the quadrature LO calibration signal (CAL_LO_Q), measuring the Rx BB-I signal output of the in phase baseband filter (BBF I(t))($Q_{TX}I_{RX}$=Acos($\theta$+ε−90°)) and the Rx BB-Q signal output of the quadrature baseband filter (BBF Q(t)) ($Q_{TX}Q_{RX}$=αAcos($\theta$+ε−$\varphi$));
    deriving an Rx I/Q phase error correction factor $\varphi c$;
    deriving an Rx I/Q gain ratio $\alpha c$;

applying the Rx I/Q phase error correction factor φc and the Rx I/Q gain ratio αc to the Rx BB-I signal and to the Rx BB-Q signal to obtain a frequency independent compensation signal for input to a correction function (h(t));

adjusting the second phase shifter to obtain an additional set of outputs from the in phase baseband filter (BBF I(t)) and the quadrature baseband filter (BBF Q(t)); and combining an adjusted output of the in phase baseband filter (BBF I(t)) after the second phase shifter is adjusted to obtain an additional set of outputs from the in phase baseband filter (BBF I(t)) and the quadrature baseband filter (BBF Q(t)) with an output of the correction function (h(t)) to generate a frequency dependent compensated signal.

11. The method of claim 10, wherein deriving the Rx I/Q phase error correction factor φc and deriving the Rx I/Q gain ratio αc includes iteratively solving for the unknowns $\theta_0$, $\theta_1$ $\varepsilon$, $\varphi$, $\alpha$, $A_0$, $A_1$.

12. The method of claim 10, further comprising alternatively mixing the in phase LO signal and the quadrature LO signal with a baseband (BB) information signal.

13. The method of claim 10, wherein the signal generation circuit provides a real (bi-phase) transmit signal.

14. The method of claim 10, wherein the correction function (h(t)) adapts the frequency dependent compensation signal to at least one of the compensated in phase Rx signal and the compensated quadrature Rx signal.

15. A device for performing radio frequency (RF) residual sideband (RSB) calibration, comprising:
means for enabling a residual sideband (RSB) signal generation circuit;
means for adjusting a first phase shifter in a signal generation circuit so that a receive (Rx) baseband (BB) in phase signal and a Rx BB quadrature signal have a similar amplitude;
means for setting a second phase shifter to an initial code (dCT+/−Δ);
means for selecting a first (in phase) local oscillator (LO) calibration signal (CAL_LO_I) at the RSB signal generation circuit;
means responsive to the in phase LO calibration signal (CAL_LO_I) for measuring an Rx BB-I output of an in phase baseband filter (BBF I(t))($I_{TX}I_{RX}$=Acos($\theta$)) and an Rx BB-Q output of a quadrature baseband filter (BBF Q(t))($I_{TX}Q_{RX}$=$\alpha$Acos($\theta$−$\varphi$+90°));
means for selecting a second (quadrature) local oscillator (LO) calibration signal (CAL_LO_Q) at the RSB signal generation circuit;
means responsive to the quadrature LO calibration signal (CAL_LO_Q) for measuring the Rx BB-I output of the in phase baseband filter (BBF I(t)) ($Q_{TX}I_{RX}$=Acos($\theta$+$\varepsilon$−90°)) and the Rx BB-Q output of the quadrature baseband filter (BBF Q(t))($Q_{TX}Q_{RX}$=$\alpha$Acos($\theta$+$\varepsilon$−$\varphi$));
means for deriving an Rx I/Q phase error correction factor φc;
means for deriving an Rx I/Q gain ratio αc;
means for applying the Rx I/Q phase error correction factor φc and the Rx I/Q gain ratio αc to the Rx BB-I signal and to the Rx BB_Q signal to obtain a frequency independent compensation signal for input to a correction function (h(t));

means for adjusting the second phase shifter to obtain an additional set of outputs from the in phase baseband filter (BBF I(t)) and the quadrature baseband filter (BBF Q(t)); and means for combining an adjusted output of the in phase baseband filter (BBF I(t)) after the second phase shifter is adjusted to obtain an additional set of outputs from the in phase baseband filter (BBF I(t)) and the quadrature baseband filter (BBF Q(t)) with an output of the correction function (h(t)) to generate a frequency dependent compensated signal.

16. The device of claim 15, wherein the means for deriving the Rx I/Q phase error correction factor φc and deriving the Rx I/Q gain ratio αc includes means for iteratively solving for the unknowns $\theta_0$, $\theta_1$ $\varepsilon$, $\varphi$, $\alpha$, $A_0$, $A_1$.

17. The device of claim 15, further comprising means for alternatively mixing the in phase LO signal and the quadrature LO signal with a baseband (BB) information signal.

18. The device of claim 15, wherein the signal generation circuit provides a real (bi-phase) transmit signal.

19. The device of claim 15, wherein the correction function (h(t)) comprises means for adapting the frequency dependent compensation signal to at least one of the compensated in phase Rx signal and the compensated quadrature Rx signal.

20. A system for radio frequency (RF) residual sideband (RSB) calibration, comprising:
a complex (in phase/quadrature (I/Q)) signal receiver;
a signal generator configured to generate a transmit (Tx) signal;
a first phase shifter operably coupled to the signal generator, the first phase shifter configured to selectively process one of an in phase local oscillator (LO) signal and a quadrature LO signal to create an initial phase between receive in phase (I) and quadrature (Q) signals to create balanced I/Q signals;
a first signal combiner configured to combine a receive (Rx) signal with the transmit (Tx) signal to generate a first combined signal;
a second phase shifter configured to provide a selected phase shift to the first combined signal; and
a complex downconverter configured to generate an in phase Rx signal and a quadrature Rx signal alternatively using the in phase LO signal and the quadrature LO signal to generate one or more signals indicative of relative Tx-Rx LO phase ($\theta$), amplitude (A), Tx LO I/Q phase mismatch ($\varepsilon$), Rx I/Q amplitude mismatch ($\alpha$), and Rx I/Q phase mismatch ($\varphi$) at the output of the complex receiver.

21. The system of claim 20, wherein the second phase shifter comprises an inductive (L) capacitive (C) circuit including an adjustable capacitance and an inductance.

22. The system of claim 20, wherein the in phase LO signal and the quadrature LO signal are alternatively combined with a baseband (BB) information signal.

23. The system of claim 20, wherein the signal generator comprises an ultra-wideband (UWB) transmitter configured to provide a real (bi-phase) transmit signal.

24. The system of claim 20, wherein the first phase shifter is a coarse phase shifter.

25. The system of claim 24, wherein the phase shifts generated by the second phase shifter are smaller compared to the phase shifts provided by the first phase shifter.

* * * * *